(12) United States Patent
Oohashi et al.

(10) Patent No.: US 6,373,163 B1
(45) Date of Patent: Apr. 16, 2002

(54) STATOR FOR AN ALTERNATOR

(75) Inventors: Atsushi Oohashi; Katsumi Adachi, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/637,875

(22) Filed: Aug. 15, 2000

(30) Foreign Application Priority Data

Jan. 20, 2000 (JP) ........................................ 2000-011704

(51) Int. Cl.⁷ ................................................ H02K 1/00
(52) U.S. Cl. ........................................ 310/198; 310/184
(58) Field of Search ................................ 310/179, 180, 310/184, 198, 207, 208, 254, 206; 29/896–898; 242/432

(56) References Cited

U.S. PATENT DOCUMENTS

| 4,914,335 | A | * | 4/1990 | Horton et al. | ............... | 310/207 |
| 5,231,324 | A | * | 7/1993 | Kawamura et al. | ......... | 310/198 |
| 5,376,852 | A | * | 12/1994 | Kawamura et al. | ......... | 310/198 |
| 6,285,105 | B1 | * | 9/2001 | Asao et al. | ................. | 310/208 |

FOREIGN PATENT DOCUMENTS

| DE | 199-22-794 | * | 11/1999 |
| JP | 47-29361 | | 9/1972 |
| JP | 62-272836 | | 11/1987 |
| JP | 3-245760 | | 11/1991 |
| JP | 4-26345 | * | 1/1992 |
| JP | 5-95644 | | 4/1993 |
| JP | 10-14149 | | 1/1998 |
| JP | 11-98788 | | 4/1999 |
| JP | 11-155270 | * | 6/1999 |
| JP | 11-164500 | | 6/1999 |
| JP | 11-164506 | | 6/1999 |

* cited by examiner

Primary Examiner—Tran Nguyen
(74) Attorney, Agent, or Firm—Sughrue Mion, PLLC

(57) ABSTRACT

A stator for an alternator includes a stator winding including a number of winding sub-portions which are constituted by at least one winding assembly composed of a pair of first and second winding groups, the first winding group including a number of first winding sub-portions each having one turn constructed by winding one of the strands of wire so as to alternately occupy an inner layer and an outer layer in a slot depth direction within the slots at intervals of the predetermined number of slots, and the second winding group including a number of second winding sub-portions each having one turn constructed by winding one of the strands of wire so as to alternately occupy an inner layer and an outer layer in a slot depth direction within the slots at intervals of the predetermined number of slots and so as to be inversely wound and offset by an electrical angle of 180° relative to the first winding sub-portions, wherein the stator winding is constituted by a three-phase alternating-current winding occupying n slots per phase per pole in which there is a phase difference corresponding to an electrical angle of 120° between each phase, and wherein the first winding sub-portions and the second winding sub-portions which constitute the same phase within the winding assembly are connected by same-address crossover connections at the same address in each phase, the same-address crossover connections of each phase being disposed at a slot pitch of 4n or more.

17 Claims, 21 Drawing Sheets

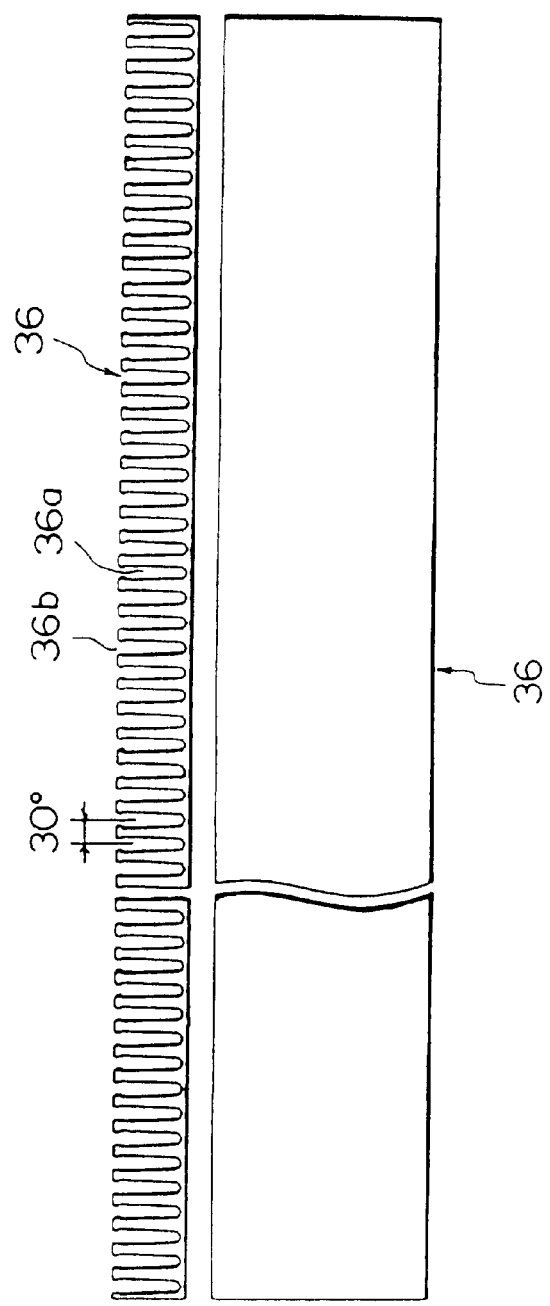

STATOR FOR AN ALTERNATOR

BACKGROUND OF THE INVENTION

1. Field of the Invention

The present invention relates to a stator for an alternator driven by an internal combustion engine, for example, and in particular, relates to a stator construction for an automotive alternator mounted to an automotive vehicle such as a passenger car or a truck.

2. Description of the Related Art

FIG. 22 is a side elevation showing part of a stator of a conventional automotive alternator such as described in Japanese Patent No. 2927288, for example, FIG. 23 is a perspective showing a conductor segment used in the stator of the conventional automotive alternator shown in FIG. 22, and FIGS. 24 and 25 are perspectives from a front end and a rear end, respectively, of part of the stator of the conventional automotive alternator shown in FIG. 22.

In FIGS. 22 to 25, the stator 50 includes: a stator core 51; a stator winding 52 wound onto the stator core 51; and insulators 53 mounted inside slots 51a, the insulators 53 insulating the stator winding 52 from the stator core 51. The stator core 51 is a cylindrical laminated core laminated by stacking thin steel plates, and has a number of slots 51a extending axially disposed at even pitch circumferentially so as to be open on an inner circumferential side. In this case, ninety-six slots 51a are formed so as to house two three-phase winding portions such that the number of slots housing each winding phase portion corresponds to the number of magnetic poles (sixteen) in a rotor (not shown). The stator winding 52 is constructed by joining a number of short conductor segments 54 in a predetermined winding pattern.

The conductor segments 54 are formed into a general U shape from an insulated copper wire material having a rectangular cross section, and are inserted two at a time from an axial rear end into pairs of slots 51a six slots apart (a pitch of one magnetic pole). Then, end portions of the conductor segments 54 extending outwards at a front end are joined to each other to constitute the stator winding 52.

More specifically, in pairs of slots 15a six slots apart, first conductor segments 54 are inserted from the rear end into first positions from an outer circumferential side within first slots 51a and into second positions from the outer circumferential side within second slots 51a, and second conductor segments 54 are inserted from the rear end into third positions from the outer circumferential side within the first slots 51a and into fourth positions from the outer circumferential side within the second slots 51a. Thus, within each slot 15a, four straight portions 54a of the conductor segments 54 are arranged to line up in a row in a radial direction.

Then, end portions 54b of the conductor segments 54 extending outwards at the front end from the first positions from the outer circumferential side within the first slots 51a and end portions 54b of the conductor segments 54 extending outwards at the front end from the second positions from the outer circumferential side within the second slots 51a six slots away in a clockwise direction from the first slots 51a are joined to form an outer layer winding having two turns. In addition, end portions 54b of the conductor segments 54 extending outwards at the front end from the third positions from the outer circumferential side within the first slots 51a and end portions 54b of the conductor segments 54 extending outwards at the front end from the fourth positions from the outer circumferential side within the second slots 51a six slots away in a clockwise direction from the first slots 51a are joined to form an inner layer winding having two turns.

In addition, the inner-layer winding and outer-layer winding constituted by the conductor segments 54 inserted into the pairs of slots 51a six slots apart are connected in series to form one winding phase portion having four turns.

A total of six winding phase portions each having four turns are formed in this manner such that slots into which the conductor segments 54 are inserted are offset by one slot each. A stator winding composed of two three-phase alternating-current windings is constructed by connecting the winding phase portions three apiece into alternating-current connections.

In the conventional stator 50 constructed in this manner, at the rear end of the stator core 51, turn portions 54c of pairs of conductor segments 54 inserted into the same pairs of slots 15a are lined up in rows in a radial direction. As a result, the turn portions 54c are arranged in two rows circumferentially to constitute a rear-end coil end group.

At the front end of the stator core 51, on the other hand, joint portions formed by joining the end portions 54b of the conductor segments 54 extending outwards at the front end from the first positions from the outer circumferential side within the first slots 51a and the end portions 54b of the conductor segments 54 extending outwards at the front end from the second positions from the outer circumferential side within the second slots 51a six slots away from the first slots 51a, and joint portions formed by joining the end portions 54b of the conductor segments 54 extending outwards at the front end from the third positions from the outer circumferential side within the first slots 51a and the end portions 54b of the conductor segments 54 extending outwards at the front end from the fourth positions from the outer circumferential side within the second slots 51a six slots away from the first slots 51a are arranged to line up radially. As a result, joint portions formed by joining end portions 54b to each other are arranged in two rows circumferentially to constitute a front-end coil end group.

In the stator 50 of the conventional automotive alternator, as explained above, the stator winding 52 is constructed by inserting short conductor segments 54 formed in the general U shape into the slots 51a of the stator core 51 from the rear end, and joining end portions 54b of the conductor segments 54 extending outwards at the front end.

Thus, because the front-end coil end group is constructed by circumferentially arranging the joint portions formed by joining the end portions 54b, which have lost their insulation due to soldering or welding, the coil-end construction is easily corroded by exposure to moisture, making corrosion resistance extremely low.

Furthermore, because the front-end coil end group is composed of two rows of ninety-six joint portions, i.e., 192 joint portions, the construction facilitates short-circuiting between the joint portions, increasing the likelihood of short-circuiting accidents.

A large number of the short conductor segments 54 must be inserted into the stator core 51 and their end portions 54b must be joined by welding, soldering, etc., significantly reducing operability. Furthermore, the amount of each conductor segment 54 which is inserted into the slots 51a must be greater than the length of the stator core 51, facilitating damage to the insulation and reducing the quality of the finished product. In addition, when joining the end portions 54b, short-circuiting often occurs between the joint portions due to spilt solder or weld melt, significantly decreasing mass-producibility.

In the conventional stator 50, the end portions 54*b* of the conductor segments 54 are joined to each other by clamping a portion thereof in a jig, and soldering or welding the tips thereof. Thus, because clamping area is required for the jig and expansion of the soldered portions or welded portions occurs, the height of the coil ends is increased and space between the joint portions is reduced. Furthermore, when the end portions 54*b* of the conductor segments 54 are welded, the conductor segments 54 are softened by temperature increases during welding, leading to decreases in the rigidity of the stator. As a result, when the conventional stator 50 is mounted to an automotive alternator, coil leakage reactance in the coil end portions is increased, causing output to deteriorate, wind resistance is increased, exacerbating wind noise, and rigidity of the stator is reduced, decreasing the effective reduction in magnetic noise.

SUMMARY OF THE INVENTION

The present invention aims to solve the above problems and an object of the present invention is to provide a stator for an alternator increasing corrosion resistance and insulation properties by significantly reducing the number of joints in the coil ends using winding assemblies composed of an arrangement of a number of winding sub-portions each having one turn composed of continuous wire, improving assembly and productivity by improving the installation of the windings into the stator core, and preventing short-circuiting between connecting portions between the winding portions constituting the three-phase alternating-current windings in advance and enabling improved reliability by adapting the positioning of the connecting portions.

In order to achieve the above object, according to one aspect of the present invention, there is provided a stator for an alternator including a cylindrical stator core composed of a laminated iron core formed with a number of slots extending axially at a predetermined pitch in a circumferential direction, and a stator winding including a number of winding sub-portions in each of which a long strand of wire is wound so as to alternately occupy an inner layer and an outer layer in a slot depth direction within the slots at intervals of a predetermined number of slots, the strand of wire folding back outside the slots at axial end surfaces of the stator core, wherein the winding sub-portions are constituted by at least one winding assembly composed of a pair of first and second winding groups, the first winding group including a number of first winding sub-portions each having one turn constructed by winding one of the strands of wire so as to alternately occupy an inner layer and an outer layer in a slot depth direction within the slots at intervals of the predetermined number of slots, the first winding sub-portions being disposed at a pitch of one slot from each other and being equal in number to the predetermined number of slots, and the second winding group including a number of second winding sub-portions each having one turn constructed by winding one of the strands of wire so as to alternately occupy an inner layer and an outer layer in a slot depth direction within the slots at intervals of the predetermined number of slots and so as to be inversely wound and offset by an electrical angle of 180° relative to the first winding sub-portions, the second winding sub-portions being disposed at a pitch of one slot from each other and being equal in number to the predetermined number of slots, wherein the stator winding is constituted by a three-phase alternating-current winding occupying n slots per phase per pole in which there is a phase difference corresponding to an electrical angle of 120° between each phase, and wherein the first winding sub-portions and the second winding sub-portions which constitute the same phase within the winding assembly are connected by same-address crossover connections at the same address in each phase, the same-address crossover connections of each phase being disposed at a slot pitch of 4n or more.

According to another aspect of the present invention, there is provided a stator for an alternator including a cylindrical stator core composed of a laminated iron core formed with a number of slots extending axially at a predetermined pitch in a circumferential direction, and a stator winding including a number of winding sub-portions in each of which a long strand of wire is wound so as to alternately occupy an inner layer and an outer layer in a slot depth direction within the slots at intervals of a predetermined number of slots, the strand of wire folding back outside the slots at axial end surfaces of the stator core, wherein the winding sub-portions are constituted by at least one winding assembly composed of a pair of first and second winding groups, the first winding group including a number of first winding sub-portions each having one turn constructed by winding one of the strands of wire so as to alternately occupy an inner layer and an outer layer in a slot depth direction within the slots at intervals of the predetermined number of slots, the first winding sub-portions being disposed at a pitch of one slot from each other and being equal in number to the predetermined number of slots, and the second winding group including a number of second winding sub-portions each having one turn constructed by winding one of the strands of wire so as to alternately occupy an inner layer and an outer layer in a slot depth direction within the slots at intervals of the predetermined number of slots and so as to be inversely wound and offset by an electrical angle of 180° relative to the first winding sub-portions, the second winding sub-portions being disposed at a pitch of one slot from each other and being equal in number to the predetermined number of slots, wherein the stator winding is constituted by a three-phase alternating-current winding occupying n slots per phase per pole in which there is a phase difference corresponding to an electrical angle of 120° between each phase, and wherein the first winding sub-portions and the second winding sub-portions which constitute the same phase within the winding assembly are connected by same-address crossover connections at addresses different from adjacent phases, the same-address crossover connections of each phase being disposed at a slot pitch of 2 n or more.

BRIEF DESCRIPTION OF THE DRAWINGS

FIGS. 14A and 14B are a side elevation and a rear elevation, respectively, explaining the construction of a stator core used in the automotive alternator according to Embodiment 1 of the present invention;

DETAILED DESCRIPTION OF THE PREFERRED EMBODIMENTS

The preferred embodiments of the present invention will be explained below with reference to the drawings.

Embodiment 1

Figure 1:
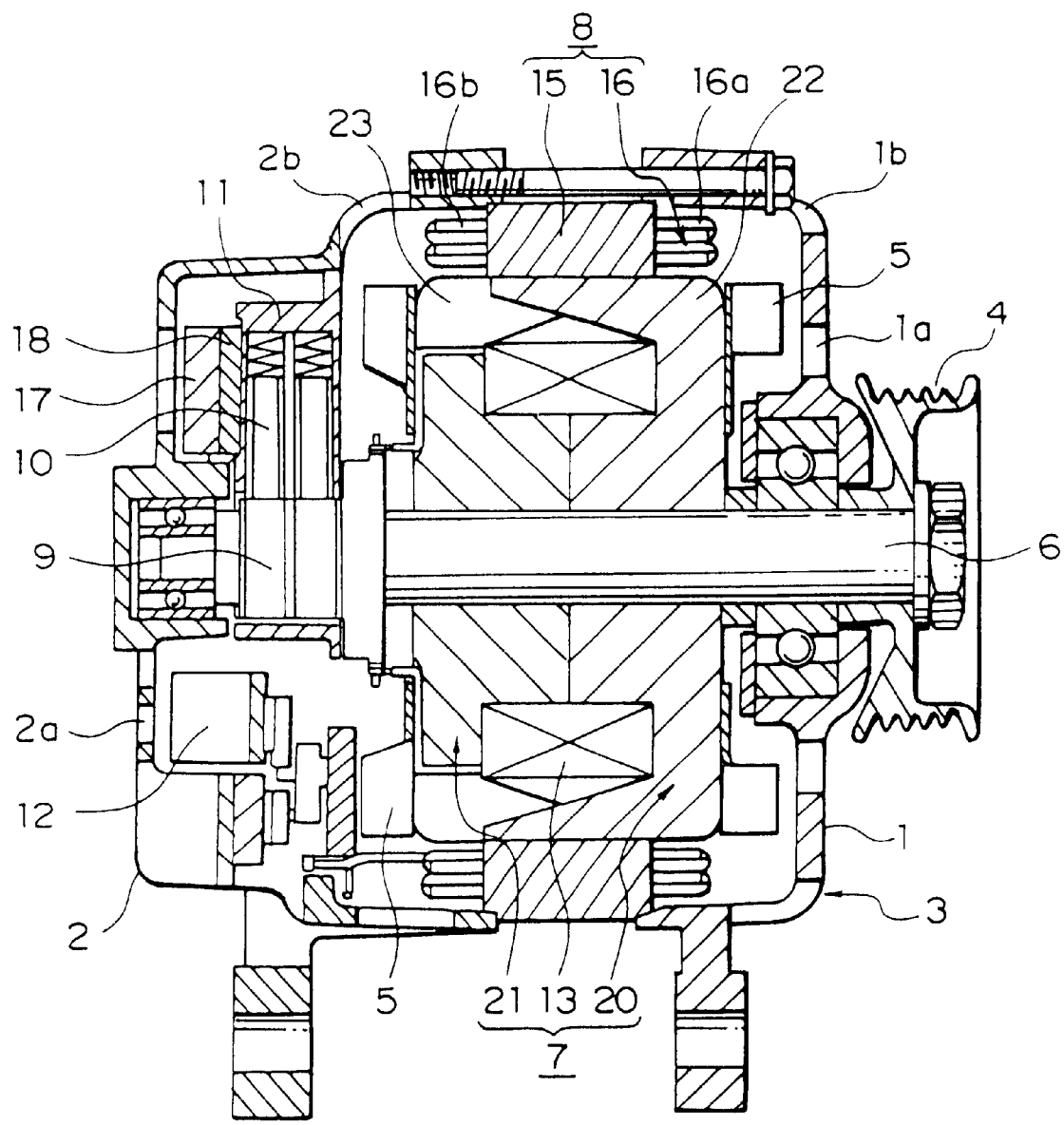
FIG. 1 is a cross section showing a construction of an automotive alternator according to Embodiment 1 of the present invention.
Figure 2:
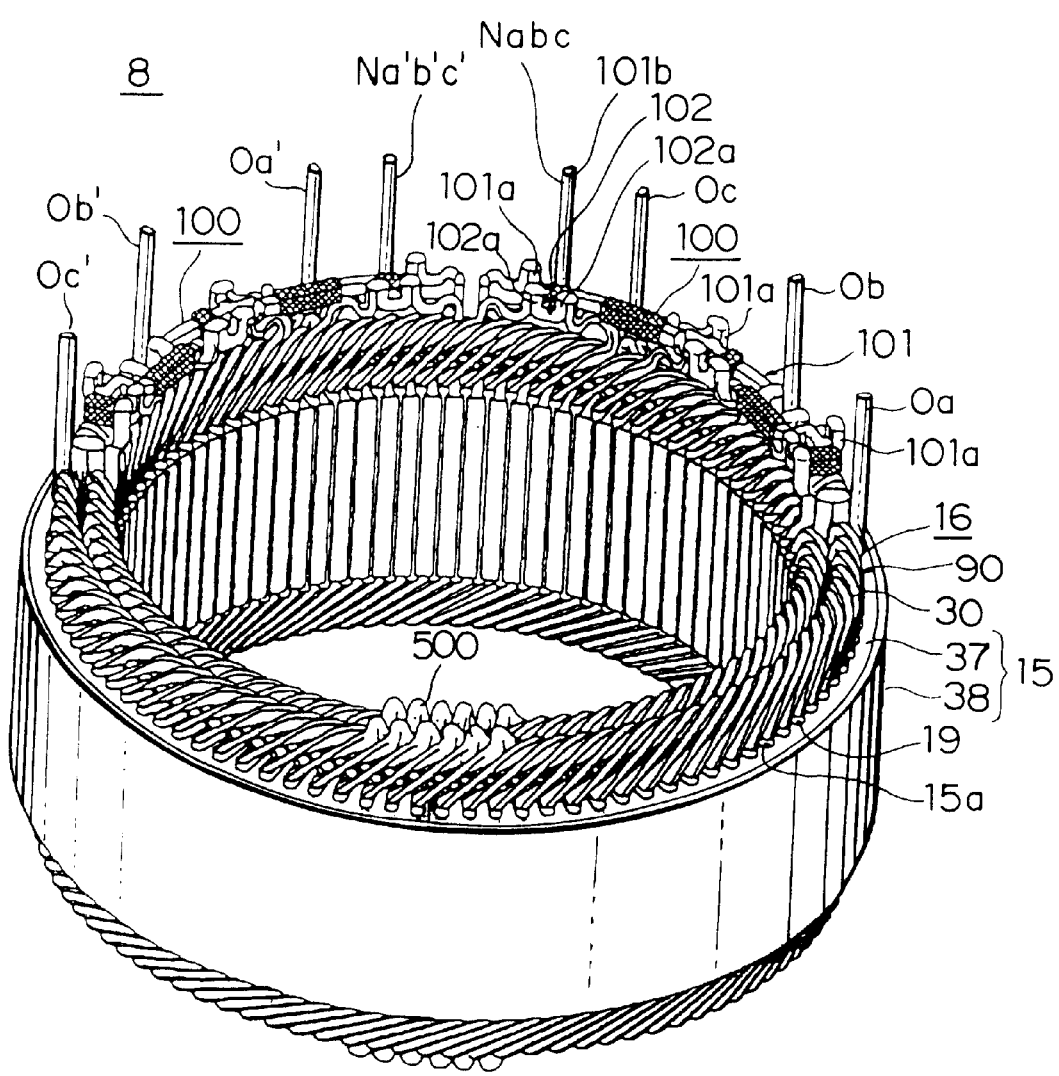
FIG. 2 is a perspective showing a stator of the automotive alternator according to Embodiment 1 of the present invention.
Figure 3:
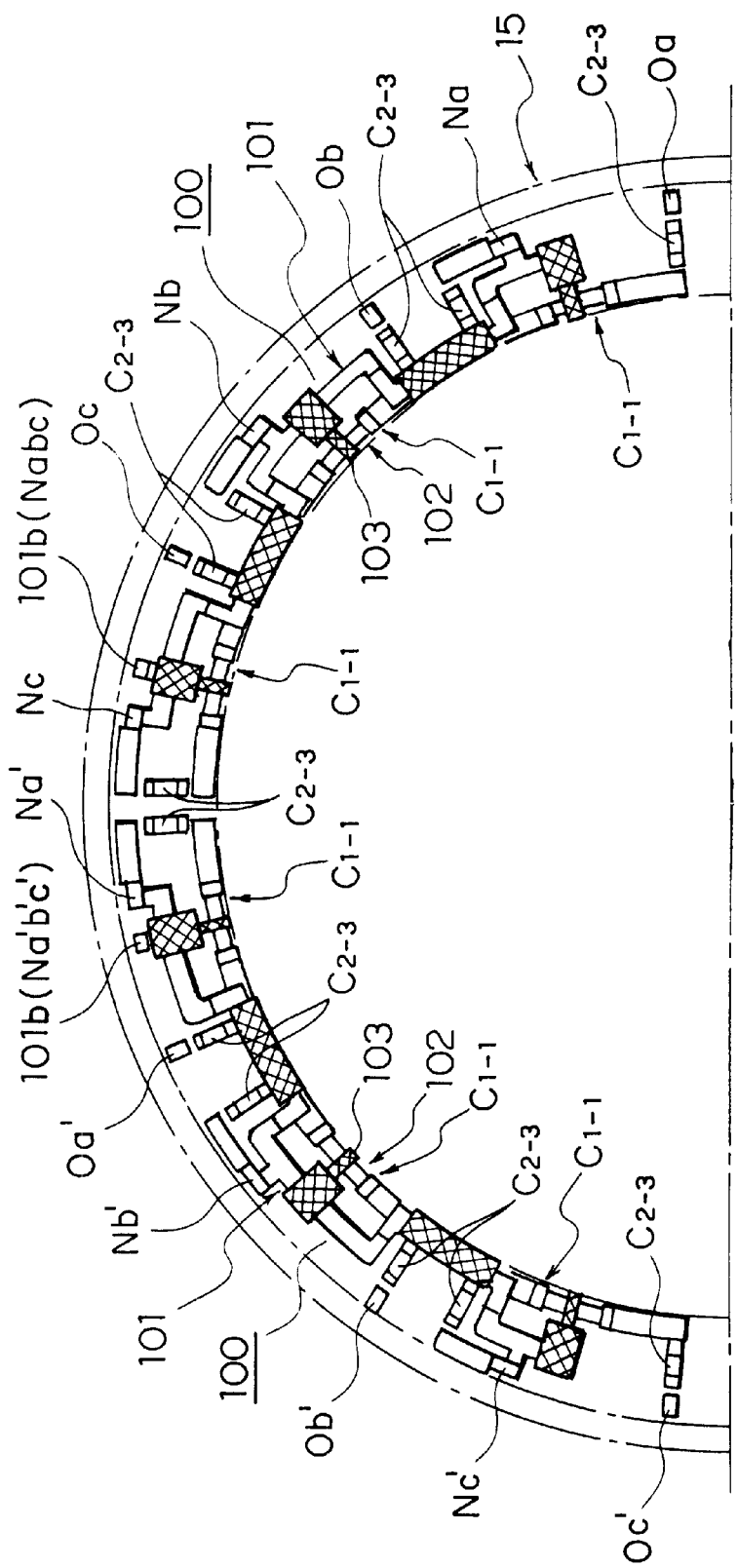
FIG. 3 is a partial end elevation of the stator of the automotive alternator according to Embodiment 1 of the present invention.
Figure 4:
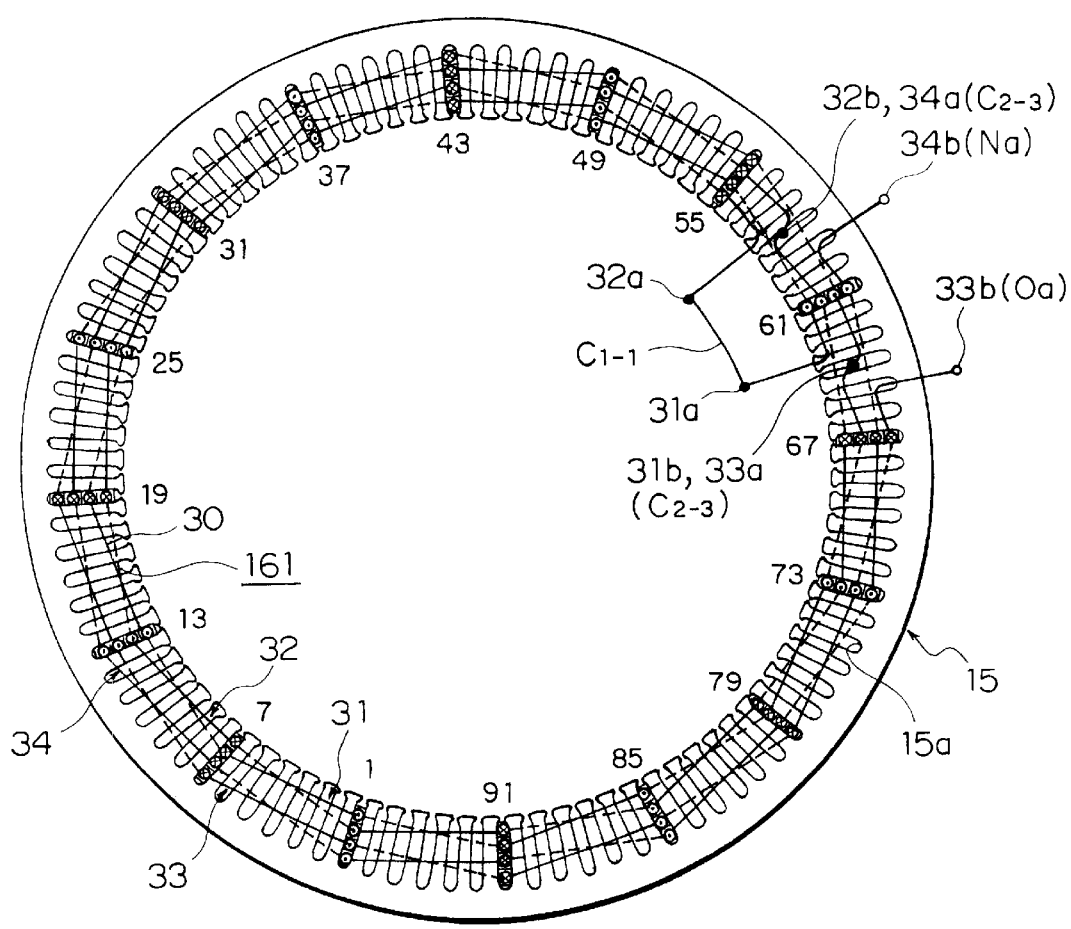
FIG. 4 is an end elevation explaining connections in one stator winding phase portion in the automotive alternator according to Embodiment 1 of the present invention.
Figure 5:
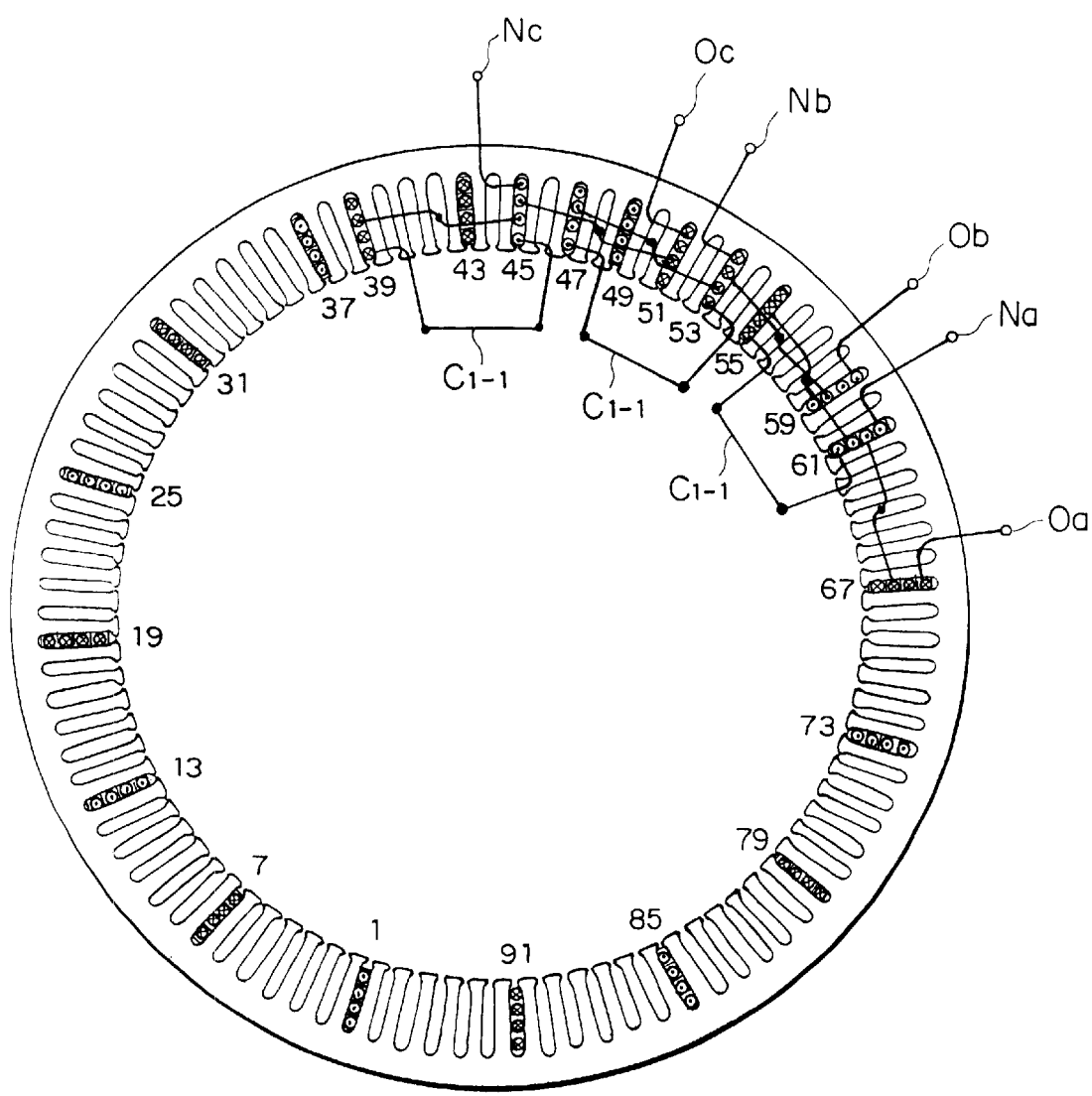
FIG. 5 is an end elevation explaining connections among three stator winding phase portions in the automotive alternator according to Embodiment 1 of the present invention.
Figure 6:
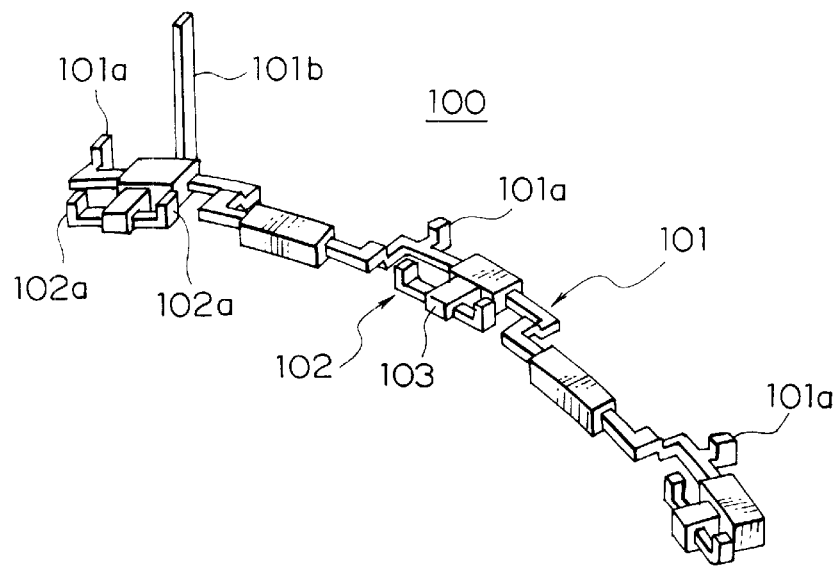
FIG. 6 is a perspective showing three-phase alternating-current connection terminals in the automotive alternator according to Embodiment 1 of the present invention.
Figure 7:
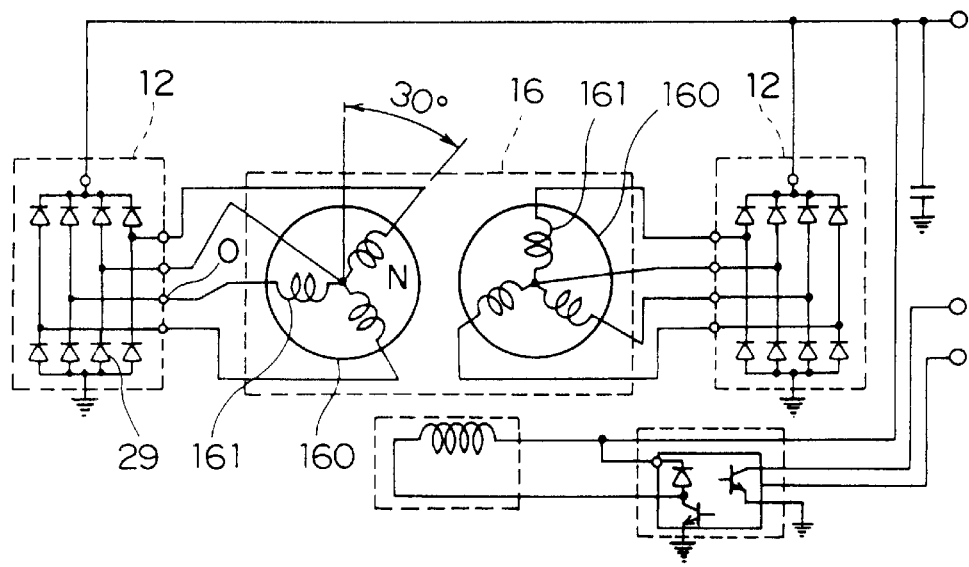
FIG. 7 is a circuit diagram for the automotive alternator according to Embodiment 1 of the present invention.
Figure 8:
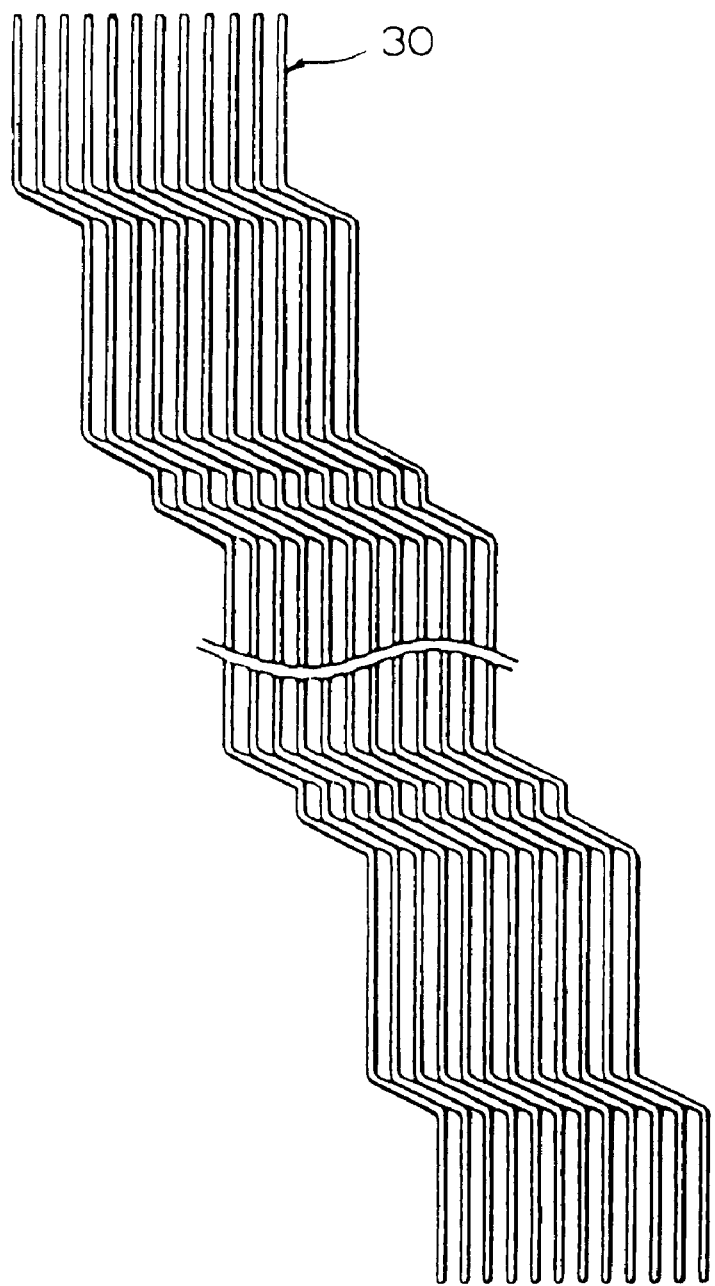
FIG. 8 is a diagram explaining the manufacturing process for winding assemblies constituting part of the stator winding used in the automotive alternator according to Embodiment 1 of the present invention.
Figure 9:
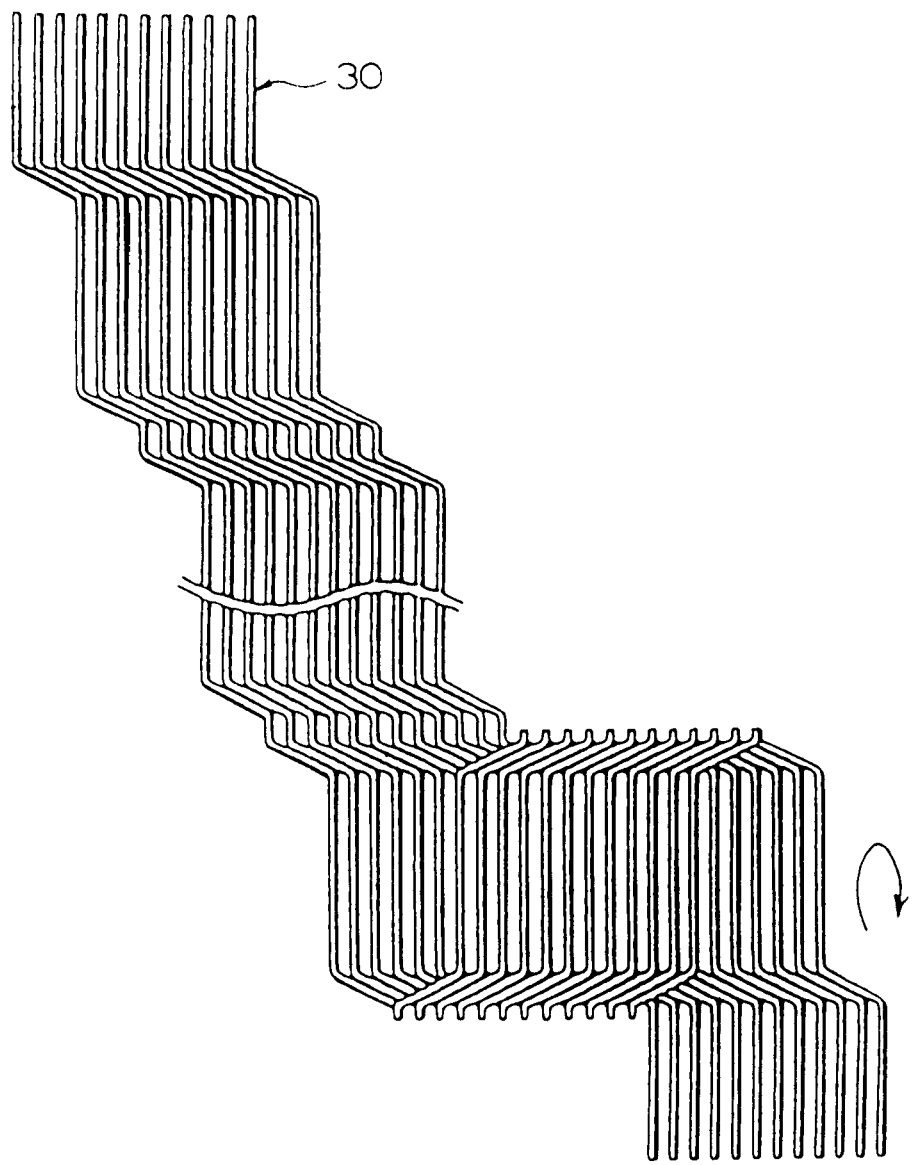
FIG. 9 is a diagram explaining the manufacturing process for winding assemblies constituting part of the stator winding used in the automotive alternator according to Embodiment 1 of the present invention.
Figure 10:
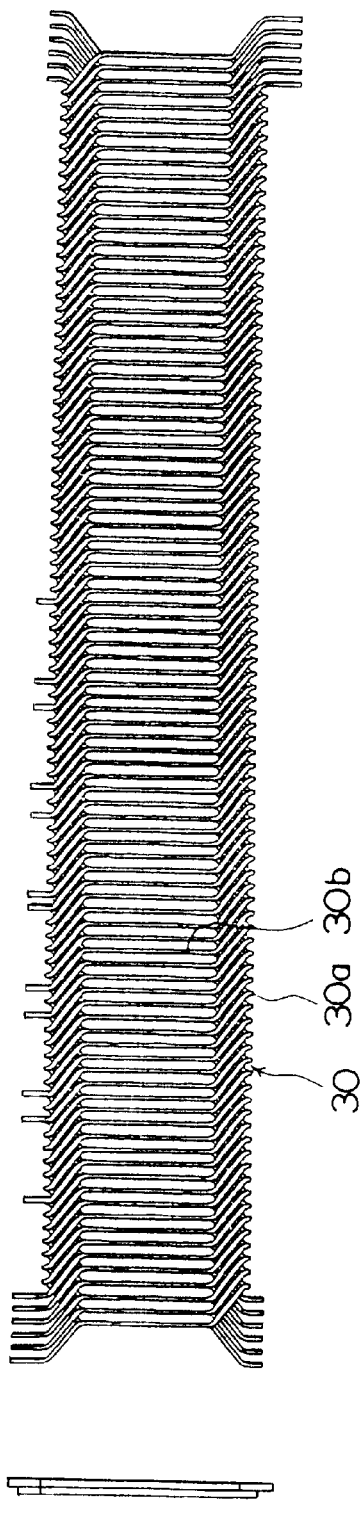
FIGS. 10A and 10B are an end elevation and a plan, respectively, showing one of the winding assemblies constituting part of the stator winding used in the automotive alternator according to Embodiment 1 of the present invention.
Figure 11:
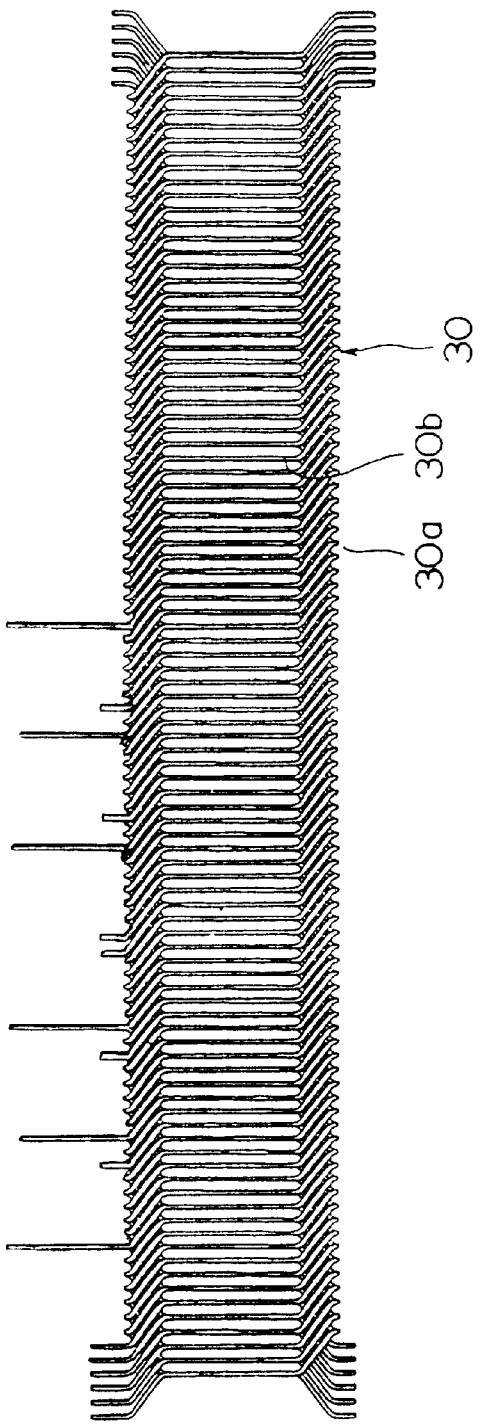
FIGS. 11A and 11B are an end elevation and a plan, respectively, showing another of the ending assemblies constituting part of the stator winding used in the automotive alternator according to Embodiment 1 of the present invention.
Figure 12:
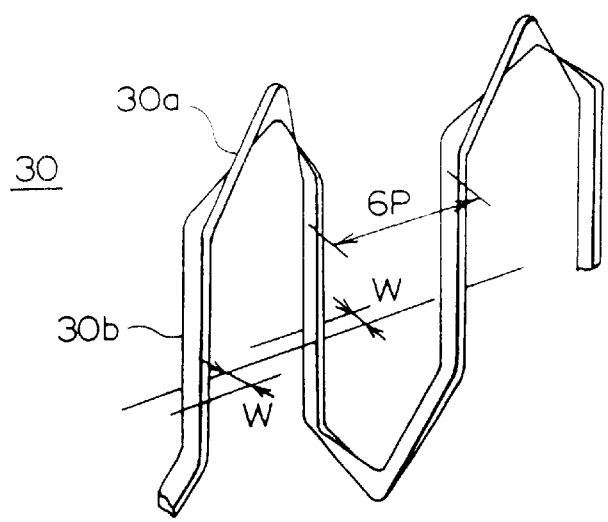
FIG. 12 is a perspective showing part of a strand of wire constituting part of the stator winding used in the automotive alternator according to Embodiment 1 of the present invention.
Figure 13:
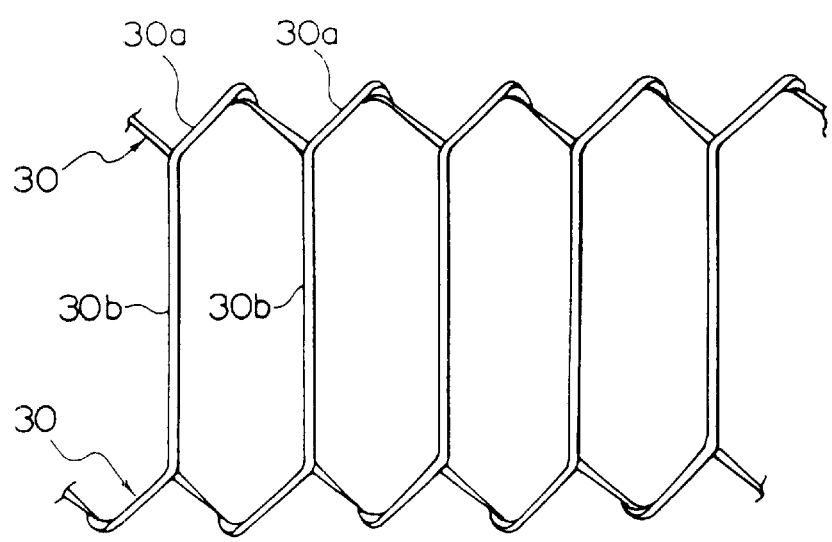
FIG. 13 is a diagram explaining arrangement of the strands of wire constituting part of the stator winding used in the automotive alternator according to Embodiment 1 of the present invention.
Figure 15A:
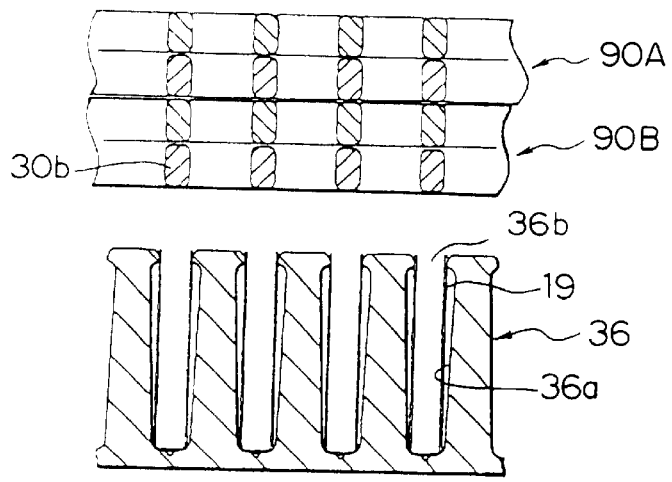
FIGS. 15A, 15B, and 15C are cross sections explaining the manufacturing process for the stator used in the automotive alternator according to Embodiment 1 of the present invention.
Figure 15B:
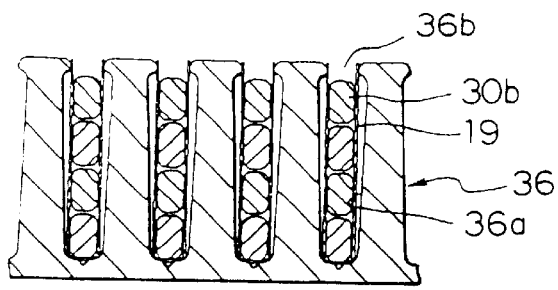
Figure 15C:
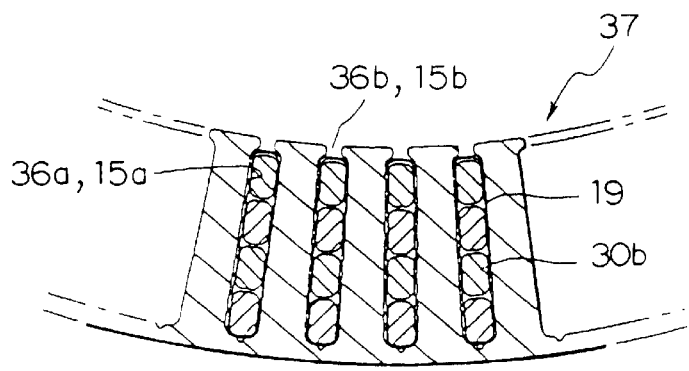
Figure 16:
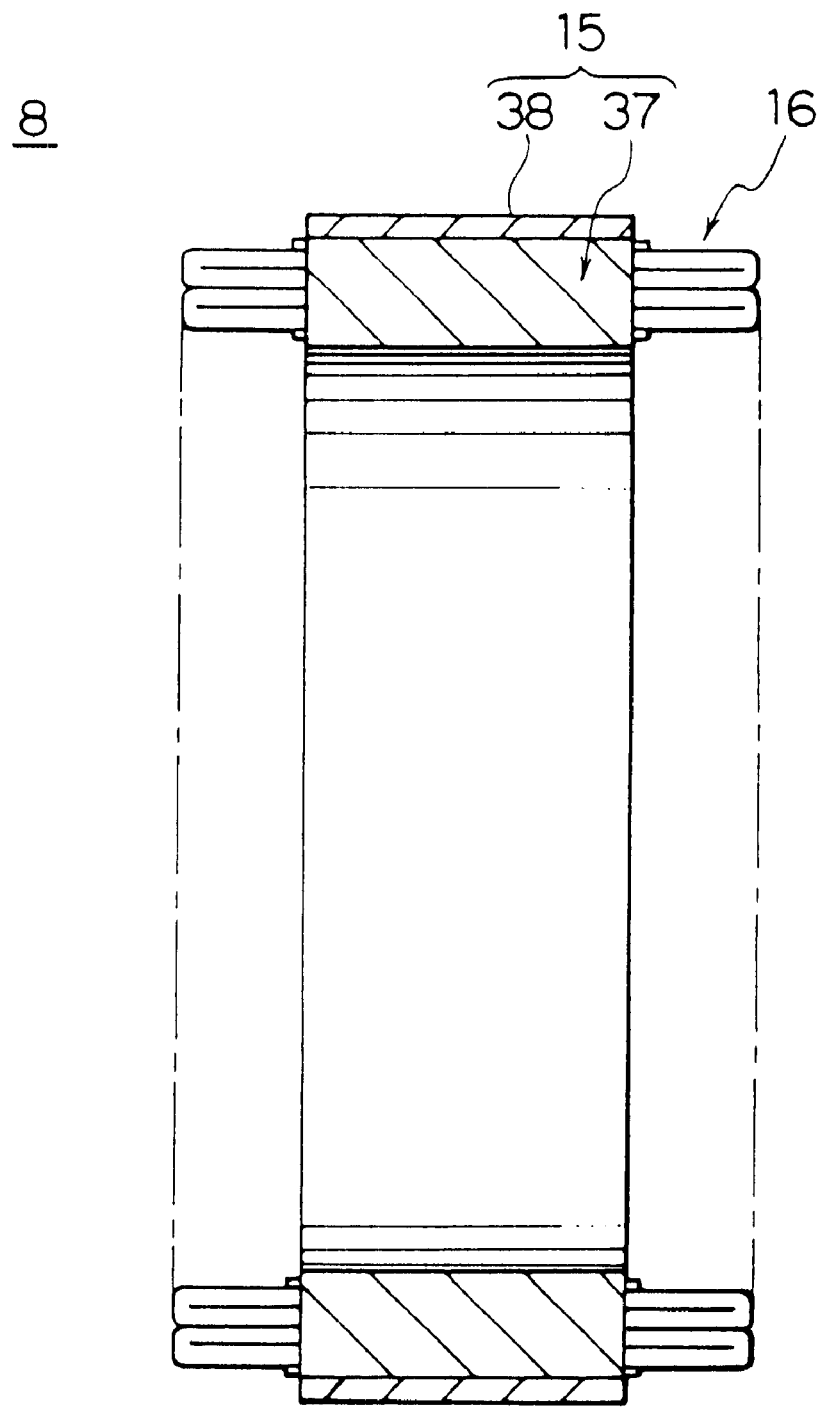
FIG. 16 is a cross section explaining the manufacturing process for the stator used in the automotive alternator according to Embodiment 1 of the present invention.

FIG. 1 is a cross section showing a construction of an automotive alternator according to Embodiment 1 of the present invention, FIG. 2 is a perspective showing a stator of the present automotive alternator, FIG. 3 is a partial end elevation of the stator of the present automotive alternator, FIG. 4 is an end elevation explaining connections in one stator winding phase portion in the present automotive alternator, FIG. 5 is an end elevation explaining connections among three stator winding phase portions in the present automotive alternator, FIG. 6 is a perspective showing three-phase alternating-current connection terminals in the present automotive alternator, FIG. 7 is a circuit diagram for the present automotive alternator, FIGS. 8 and 9 are diagrams explaining the manufacturing process for winding assemblies constituting part of the stator winding used in the present automotive alternator, FIGS. 10A and 10B are an end elevation and a plan, respectively, showing one of the winding assemblies constituting part of the stator winding used in the present automotive alternator, FIGS. 11A and 11B are an end elevation and a plan, respectively, showing another of the winding assemblies constituting part of the stator winding used in the present automotive alternator, FIG. 12 is a perspective showing part of a strand of wire constituting part of the stator winding used in the present automotive alternator, FIG. 13 is a diagram explaining arrangement of the strands of wire constituting part of the stator winding used in the present automotive alternator, FIGS. 14A and 14B are a side elevation and a rear elevation, respectively, explaining the construction of a stator core used in the present automotive alternator, FIGS. 15A, 15B, and 15C are cross sections explaining the manufacturing process for the stator used in the present automotive alternator, and FIG. 16 is a cross section explaining the manufacturing process for the stator used in the present automotive alternator.

In FIG. 1, the automotive alternator is constructed by rotatably mounting a Lundell-type rotor 7 by means of a shaft 6 inside a case 3 constructed from an aluminum front bracket 1 and an aluminum rear bracket 2, and fastening a stator 8 to an inner wall of the case 3 so as to cover an outer circumferential side of the rotor 7.

The shaft 6 is rotatably supported in the front bracket 1 and the rear bracket 2. A pulley 4 is fastened to a first end of this shaft 6 so that rotational torque from an engine can be transmitted to the shaft 6 by means of a belt (not shown).

Slip rings 9 for supplying electric current to the rotor 7 are fastened to a second end of the shaft 6, and a pair of brushes 10 are housed in a brush holder 11 disposed inside the case 3 such that the pair of brushes 10 slide in contact with the slip rings 9. A regulator 18 for adjusting the magnitude of alternating voltage generated in the stator 8 is fastened by adhesive to a heat sink 17 fitted onto the brush holder 11. Rectifiers 12 which are electrically connected to the stator 8 and convert alternating current generated in the stator 8 into direct current are mounted inside the case 3.

The rotor 7 is composed of a rotor coil 13 for generating magnetic flux on passage of electric current, and a pair of pole cores 20 and 21 disposed so as to cover the rotor coil 13, magnetic poles being formed in the pole cores 20 and 21 by magnetic flux generated in the rotor coil 13. The pair of pole cores 20 and 21 are made of iron, each has eight claw-shaped magnetic poles 22 and 23 disposed on an outer circumferential perimeter at even pitch in a circumferential direction so as to project axially, and the pole cores 20 and 21 are fastened to the shaft 6 facing each other such that the claw-shaped magnetic poles 22 and 23 intermesh. In addition, fans 5 are fastened to first and second axial ends of the rotor 7.

Air intake openings 1a and 2a are disposed in axial end surfaces of the front bracket 1 and the rear bracket 2, and air discharge openings 1b and 2b are disposed in two outer circumferential shoulder portions of the front bracket 1 and the rear bracket 2, opposite the radial outside of the front-end and rear-end coil ends 16a and 16b of the stator winding 16.

As shown in FIGS. 2 and 3, the stator 8 includes: a cylindrical stator core 15 composed of a laminated core formed with a number of slots 15a extending axially at a predetermined pitch in a circumferential direction; a stator winding 16 wound onto the stator core 15; and insulators 19 installed in each of the slots 15a for electrically insulating the stator winding 16 from the stator core 15. The stator winding 16 includes two winding assemblies 90 disposed in two rows in a radial direction. The winding assemblies 90 include a number of winding sub-portions in each of which one strand of wire 30 is bent back outside the slots 15a at end surfaces of the stator core 15 and wound into a wave winding so as to alternately occupy an inner layer and an outer layer in a slot depth direction within slots 15a a predetermined number of slots apart. The winding sub-portions are connected into three-phase alternating-current connections using three-phase alternating-current terminals 100 to form two three-phase alternating-current windings 160, which are described below. Moreover, in FIGS. 2 and 3, Oa, Ob, Oc, Na, Nb, and Nc represent output wires and neutral points of respective phase portions of a first three-phase alternating-current winding 160, Nabc represents a neutral-point lead wire of the first three-phase alternating-current winding 160, Oa', Ob', Oc', Na', Nb', and Nc' represent output wires and neutral points of respective phase portions of a second three-phase alternating-current winding 160, and Na'b'c' represents a neutral-point lead wire of the second three-phase alternating-current winding 160. Furthermore, $C_{1-1}$ represents same-address crossover connections between first addresses described below, and $C_{2-3}$ represents adjacent-address crossover connections between a second address and a third address.

In this case, the stator core 15 is formed with ninety-six slots 15a at even pitch so as to house the two three-phase alternating-current windings 160 such that the number of slots housing each phase portion of the alternating-current windings corresponds to the number of magnetic poles (sixteen) in the rotor 7. In other words, there are two slots per pole per phase. Long, insulated copper wire material having a rectangular cross section, for example, is used in the strands of wire 30.

Next, the winding construction of one stator winding phase portion 161 will be explained in detail with reference to FIG. 4.

One stator winding phase portion 161 is composed of first to fourth winding sub-portions 31 to 34 each formed from one strand of wire 30. The first winding sub-portion 31 is formed by wave winding one strand of wire 30 into every sixth slot from slot numbers 1 to 91 so as to alternately occupy a first position from an inner circumferential side and a second position from the inner circumferential side inside the slots 15a. The second winding sub-portion 32 is formed by wave winding a strand of wire 30 into every sixth slot from slot numbers 1 to 91 so as to alternately occupy the second position from the inner circumferential side and the first position from the inner circumferential side inside the slots 15a. The third winding sub-portion 33 is formed by wave winding a strand of wire 30 into every sixth slot from slot numbers 1 to 91 so as to alternately occupy a third position from the inner circumferential side and a fourth position from the inner circumferential side inside the slots 15a. The fourth winding sub-portion 32 is formed by wave winding a strand of wire 30 into every sixth slot from slot numbers 1 to 91 so as to alternately occupy the fourth position from the inner circumferential side and the third position from the inner circumferential side inside the slots 15a.

Thus, each of the first to fourth winding sub-portions 31 to 34 constitutes a winding sub-portion having one turn in which a single strand of wire 30 is wound into every sixth slot 15a so as to alternately occupy an inner layer and an outer layer in a slot depth direction. The strands of wire 30 are arranged to line up in a row of four strands in a radial direction within each slot 15a with the longitudinal direction of their rectangular cross sections aligned in a radial direction. Hereinafter, the positions of the strands of wire 30 within the slots 15a will be called the first address, the second address, the third address, and the fourth address, respectively, from the inner circumferential side.

Moreover, although not shown, a total of six stator winding phase portions 161 are formed by offsetting the slots 15a into which the strands of wire 30 are wound by one slot each.

At a first end of the stator core 15, a crossover connection (adjacent-address crossover connection $C_{2-3}$) is formed between a second end portion 31b of the first winding sub-portion 31 extending outwards from the second address of slot number 67 and a first end portion 33a of the third winding sub-portion 33 extending outwards from the third address of slot number 61, and a crossover connection (adjacent-address crossover connection $C_{2-3}$) is formed between a second end portion 32b of the second winding sub-portion 32 extending outwards from the second address of slot number 61 and a first end portion 34a of the fourth winding sub-portion 34 extending outwards from the third address of slot number 55, and in addition, a crossover connection (same-address crossover connection $C_{1-1}$) is formed between a first end portion 31a of the first winding sub-portion 31 extending outwards from the first address of slot number 61 and a first end portion 32a of the second winding sub-portion 32 extending outwards from the first address of slot number 55. Thus, the first to fourth winding sub-portions 31 to 34 are connected in series to form one stator winding phase portion 161 having four turns, namely, the stator winding a-phase portion.

At this time, a second end portion 33b of the third winding sub-portion 33 extending outwards from the fourth address of slot number 67 and a second end portion 34b of the fourth winding sub-portion 34 extending outwards from the fourth address of slot number 61 become an output wire (Oa) and a neutral point (Na), respectively, of the stator winding a-phase portion.

Similarly, as shown in FIG. 5, in the wire-strand groups wound into a slot group including slot numbers 5, 11, . . . , and 95, a crossover connection (adjacent-address crossover connection $C_{2-3}$) is formed between a second end portion 31b of the first winding sub-portion 31 extending outwards from the second address of slot number 59 and a first end portion 33a of the third winding sub-portion 33 extending outwards from the third address of slot number 53, and a crossover connection (adjacent-address crossover connection $C_{2-3}$) is formed between a second end portion 32b of the second winding sub-portion 32 extending outwards from the second address of slot number 53 and a first end portion 34a of the fourth winding sub-portion 34 extending outwards from the third address of slot number 47, and in addition, a crossover connection (same-address crossover connection $C_{1-1}$) is formed between a first end portion 31a of the first winding sub-portion 31 extending outwards from the first address of slot number 53 and a first end portion 32a of the second winding sub-portion 32 extending outwards from the first address of slot number 47. Thus, the first to fourth winding sub-portions 31 to 34 are connected in series to form a stator winding b-phase portion having four turns. A second end portion 33b of the third winding sub-portion 33 extending outwards from the fourth address of slot number 59 and a second end portion 34b of the fourth winding sub-portion 34 extending outwards from the fourth address of slot number 53 become an output wire (Ob) and a neutral point (Nb), respectively, of the stator winding b-phase portion.

Similarly, as shown in FIG. 5, in the wire-strand groups wound into a slot group including slot numbers 3, 9, ..., and 93, a crossover connection (adjacent-address crossover connection $C_{2-3}$) is formed between a second end portion 32b of the second winding sub-portion 32 extending outwards from the second address of slot number 51 and a first end portion 34a of the fourth winding sub-portion 34 extending outwards from the third address of slot number 45, and a crossover connection (adjacent-address crossover connection $C_{2-3}$) is formed between a second end portion 31b of the first winding sub-portion 31 extending outwards from the second address of slot number 45 and a first end portion 33a of the third winding sub-portion 33 extending outwards from the third address of slot number 39, and in addition, a crossover connection (same-address crossover connection $C_{1-1}$) is formed between a first end portion 32a of the second winding sub-portion 32 extending outwards from the first address of slot number 45 and a first end portion 31a of the first winding sub-portion 31 extending outwards from the first address of slot number 39. Thus, the first to fourth winding sub-portions 31 to 34 are connected in series to form a stator winding c-phase portion having four turns. A second end portion 34b of the fourth winding sub-portion 34 extending outwards from the fourth address of slot number 51 and a second end portion 33b of the third winding sub-portion 33 extending outwards from the fourth address of slot number 45 become an output wire (Oc) and a neutral point (Nc), respectively, of the stator winding c-phase portion.

In the stator winding a-phase portion, the stator winding b-phase portion, and the stator winding c-phase portion of the above construction, the same-address crossover connections $C_{1-1}$ are in the same address, namely the first address, and are disposed at a pitch of eight slots from each other. The three output wires Oa, Ob, and Oc are also disposed at a pitch of eight slots from each other, and in addition the three neutral points Na, Nb, and Nc are also disposed at a pitch of eight slots from each other.

In the wire-strand groups wound into a slot group including slot numbers 2, 8, ..., and 92, a stator winding a'-phase portion is formed by similarly connecting each of the strands of wire 30, in the wire-strand groups wound into a slot group including slot numbers 6, 12, ..., and 96, a stator winding b'-phase portion is formed by similarly connecting each of the strands of wire 30, and in the wire-strand groups wound into a slot group including slot numbers 4, 10, ..., and 94, a stator winding c'-phase portion is formed by similarly connecting each of the strands of wire 30.

Next, the same-address crossover connections and the neutral-point connections will be explained. These same-address crossover connections and neutral-point connections are made using three-phase alternating-current connection terminals 100 as shown in FIG. 6.

As shown in FIG. 6, the three-phase alternating-current connection terminals 100 are each composed of a metal neutral-point connection terminal 101 and three metal crossover connection terminals 102.

The metal neutral-point connection terminals 101 are prepared by bending metal rods of copper or the like having rectangular cross sections and each is provided with three joining segments 101a and one neutral point lead 101b. The joining segments 101a correspond to the three neutral points Na, Nb, and Nc and are disposed at a pitch of eight slots circumferentially.

The metal crossover connection terminals 102 are prepared by bending metal rods of copper or the like having rectangular cross sections into a square-cornered U shape so as to be provided with joining segments 102a. The three metal crossover connection terminals 102 are integrated with the metal neutral-point connection terminals 101 by electrically-insulative resin 103 so as to be disposed circumferentially at a pitch of eight slots.

The adjacent-address crossover connections of each phase are made by bringing side surfaces of the second end portion 31b of the first winding sub-portion 31 and the first end portion 33a of the third winding sub-portion 33 into close contact with each other, then fusing and joining the end portions 31b and 33a by arc-welding from the first end of the stator core 15, and bringing side surfaces of the second end portion 32b of the second winding sub-portion 32 and the first end portion 34a of the fourth winding sub-portion 34 into close contact with each other, then fusing and joining the end portions 32b and 34a by arc-welding from the first end of the stator core 15.

Next, the three-phase alternating-current terminals 100 are positioned at the first end of the stator core 15 such that side surfaces of each of the joining segments 101a and the neutral points Na, Nb, and Nc of the stator winding a-phase, b-phase, and c-phase portions are in close contact with each other, and each of the joining segments 101a are fused and joined to the neutral points Na, Nb, and Nc by arc-welding from the first end of the stator core 15. A same-address crossover connection is formed by bringing side surfaces of the first end portions 31a and 32a of the first and second winding sub-portions 31 and 32 of the stator winding a-phase portion and the joining segments 102a into close contact with each other, and fusing and joining the first end portions 31a and 32a to the joining segments 102a by arc-welding from the first end of the stator core 15. Similarly, same-address crossover connections are formed by fusing and joining the first end portions 31a and 32a of the first and second winding sub-portions 31 and 32 of the stator winding b-phase and c-phase portions to the joining segments 102a by arc-welding. The three-phase alternating-current winding 160 which is composed of stator winding a-phase, b-phase, and c-phase portions are obtained in this manner. Then, the neutral points Na, Nb, and Nc are electrically connected by the metal neutral-point connection terminals 101 and are integrated into a single neutral-point lead 101b.

In addition, the three-phase alternating-current terminals 100 are positioned at the first end of the stator core 15 such that side surfaces of each of the joining segments 101a and the neutral points Na', Nb', and Nc' of the stator winding a'-phase, b'-phase, and c'-phase portions are in close contact with each other, and each of the joining segments 101a are fused and joined to the neutral points Na', Nb', and Nc' by arc-welding from the first end of the stator core 15. A same-address crossover connection is formed by bringing side surfaces of the first end portions 31a and 32a of the first and second winding sub-portions 31 and 32 of the stator winding a'-phase portion and the joining segments 102a into close contact with each other, and fusing and joining the first end portions 31a and 32a to the joining segments 102a by arc-welding from the first end of the stator core 15. Similarly, same-address crossover connections are formed by fusing and joining the first end portions 31a and 32a of the first and second winding sub-portions 31 and 32 of the stator winding b'-phase and c'-phase portions to the joining segments 102a by arc-welding. Then, the neutral points Na', Nb', and Nc' are electrically connected by the metal neutral-point connection terminals 101 and are integrated into a single neutral-point lead 101b.

Thus, as shown in FIGS. 2 and 3, the stator 8 is obtained including the stator winding 16, which is composed of two three-phase alternating-current windings 160 formed by connecting the winding portions wound onto the stator core 15 into alternating-current connections using the three-phase alternating-current connection terminals 100.

Each of the three-phase alternating-current windings 160 is star-connected such that the phase difference between the three stator winding phase portions 161 therein is an electrical angle of 120°. Furthermore, the two three-phase alternating-current windings 160 are wound onto the stator core 15 so as to have a phase difference of 30° from each other. Then, as shown in FIG. 7, each of the two three-phase alternating-current windings 160 is connected to its own rectifier 12. The rectifiers 12 are connected in parallel so that the direct-current output from each is combined. Furthermore, the neutral points of each of the three-phase alternating-current windings 160 are connected to direct-current output terminals of the rectifiers by means of diodes 29.

Thus, the strands of wire 30 constituting the first to fourth winding sub-portions 31 to 34 are each wound into a wave winding so as to extend out of first slots 15a at end surfaces of the stator core 15, fold back, and enter second slots 15a six slots away. Each of the strands of wire 30 is wound so as to alternately occupy the inner layer and the outer layer relative to the slot depth direction (the radial direction) in every sixth slot. The first winding sub-portion 31 and the second winding sub-portion 32 are offset by an electrical angle of 180° so as to be inversely wound relative to each other. Similarly, the third winding sub-portion 33 and the fourth winding sub-portion 34 are also offset by an electrical angle of 180° so as to be inversely wound relative to each other.

Turn portions 30a of the strands of wire 30 extend outwards from the stator core 15 and fold back to form coil ends. The turn portions 30a which are formed into a substantially identical shape at both axial ends of the stator core 15 are mutually spaced circumferentially and radially, and arranged neatly in two rows circumferentially, to form coil end groups 16a and 16b.

Next, the assembly of the stator 8 will be explained with reference to FIGS. 8 to 16.

First, as shown in FIG. 8, twelve long strands of wire 30 are simultaneously bent in the same plane to form a lightning-bolt shape. Then, the winding assemblies 90A and 90B shown in FIGS. 10A, 10B, 11A and 11B are prepared by progressively folding the strands at right angles, as indicated by the arrow in FIG. 9, using a jig. In this folding process, specific strands of wire 30 are drawn out to form lead portions of the crossover connections, the output wires, and the neutral points. In FIGS. 10A, 10B, 11A and 11B, the numerous elements extending outwards from one side of the winding assemblies 90A and 90B correspond to the lead portions. Moreover, the constructions of the winding assemblies 90A and 90B are identical except for the lead portions of the crossover connections, the output wires, and the neutral points.

The winding assemblies 90A and 90B are annealed after preparation for ten minutes at 300° C. so that a parallelepiped core 36 mounted with the winding assemblies 90A and 90B can be easily formed into an annular shape.

Moreover, as shown in FIG. 12, each strand of wire 30 is formed by bending it into a planar pattern in which straight portions 30b connected by turn portions 30a are lined up at a pitch of six slots (6P). Adjacent straight portions 30b are offset by a distance equal to one width (W) of the strands of wire 30 by means of the turn portions 30a. The winding assemblies 90A and 90B are constructed by arranging six wire-strand pairs so as to be offset by a pitch of one slot from each other, each wire-strand pair composed of two strands of wire 30 formed in the above pattern which are offset by a pitch of six slots and arranged such that straight portions 30b overlap as shown in FIG. 13. Six end portions of the strands of wire 30 each extend outwards from first and second sides at first and second ends of the winding assemblies 90A and 90B. Furthermore, the turn portions 30a are arranged so as to line up in rows on first and second side portions of the winding assemblies 90A and 90B. Moreover, as shown in FIG. 13 the wire-strand pairs, which are arranged so that straight portions 30b are offset at a pitch of six slots and stacked one on top of another, are offset by an electrical angle of 180°.

Meanwhile, the parallelepiped core 36 is prepared as shown in FIGS. 14A and 14B by laminating a predetermined number of sheets of SPCC material formed with trapezoidal slots 36a at a predetermined pitch (an electrical angle of 30°) and laser welding an outer portion thereof.

As shown in FIG. 15A, the insulators 19 are mounted in the slots 36a of the parallelepiped core 36, and the straight portions of the two winding assemblies 90A and 90B are inserted so as to stack up within each of the slots. In this manner, the two winding assemblies 90A and 90B are installed in the parallelepiped core 36 as shown in FIG. 15B. At this time, straight portions 30b of the strands of wire 30 are housed in lines of four in a radial direction within the slots 36a and are electrically insulated from the parallelepiped core 36 by the insulators 19.

Next, the parallelepiped core 36 is rolled up and its ends abutted and welded to each other to obtain a cylindrical core 37, as shown in FIG. 15C. By rolling up the parallelepiped core 36, the slots 36a (corresponding to the slots 15a in the stator core) take on a generally rectangular cross-sectional shape, and opening portions 36b of the slots 36a (corresponding to opening portions 15b of the slots 15a ) become smaller than the slot-width dimensions of the straight portions 30b. Thereafter, the cylindrical core 37 is inserted into a cylindrical outer core 38 composed of laminated SPCC material by shrink fitting, as shown in FIG. 16, to obtain the stator 15 in which the cylindrical core 37 and the outer core 38 are integrated.

Then, end portions of the same strand of wire 30 are connected so that first to fourth winding sub-portions 31 to 34 wound into the same slot group each form winding sub-portions having one turn. Then, as explained previously, the two three-phase alternating-current windings 160 are obtained by cutting each of the lead portions of the winding assemblies 90A and 90B, forming the adjacent-address crossover connections, and then forming the same-address crossover connections and connecting the neutral points using the alternating-current connection terminals 100.

In the automotive alternator constructed in this manner, electric current is supplied from a battery (not shown) through the brushes 10 and the slip rings 9 to the rotor coil 13, generating magnetic flux. The claw-shaped magnetic poles 22 of the first pole core 20 are magnetized with north-seeking (N) poles by this magnetic flux, and the claw-shaped magnetic poles 23 of the first pole core 21 are magnetized with south-seeking (S) poles. At the same time, rotational torque from the engine is transmitted through the belt and the pulley 4 to the shaft 6, rotating the rotor 7. Thus, a rotating magnetic field is applied to the stator winding 16, generating electromotive force in the stator winding 16. This alternating electromotive force passes through the rectifiers 12 and is converted into direct current, the output voltage of the rectifier 12 is adjusted by the regulator 18, and the battery is recharged.

At the rear end, external air is drawn in through air intake openings 2a disposed opposite the heat sinks of the rectifiers 12 and the heat sink 17 of the regulator 18, respectively, by rotation of the fans 5, flowing along the axis of the shaft 6, cooling the rectifiers 12 and the regulator 18, and is then deflected centrifugally by the fans 5, cooling the rear-end coil end group 16b of the stator winding 16 before being expelled to the outside through the air discharge openings 2b. At the same time, at the front end, external air is drawn in axially through air intake openings 1a by rotation of the fans 5, and is then deflected centrifugally by the fans 5, cooling the front-end coil end group 16a of the stator winding 16 before being expelled to the outside through the air discharge openings 1b.

In this manner, according to Embodiment 1, the stator winding 16 is provided with a number of first to fourth winding sub-portions 31 to 34 in each of which one strand of wire 30 is bent back outside the slots 15a at end surfaces of the stator core 15 and wound into a wave winding so as to alternately occupy an inner layer and an outer layer in a slot depth direction within every sixth slot 15a. Two winding assemblies 90A and 90B each composed of a pair of first and second winding groups are used, the first winding group being constituted by six first winding sub-portions 31 (or third winding sub-portions 33) disposed at a pitch of one slot from each other, and the second winding group being constituted by six second winding sub-portions 32 (or fourth winding sub-portions 34) disposed at a pitch of one slot from each other wound inversely so as to be offset at an electrical angle of 180° relative to the first winding sub-portions 31 (or third winding sub-portions 33). The two winding assemblies 90A and 90B are installed in the stator core 15 so as to form two rows radially.

Thus, by installing the two winding assemblies 90A and 90B into the stator core 15 so as to form two rows radially, six stator winding phase portions 161 are installed in the stator core 15, enabling assembly to be significantly improved.

Because winding connections between the two winding assemblies 90A and 90B are formed by two adjacent-address crossover connections ($C_{2-3}$) and by one same-address crossover connection ($C_{1-1}$) in one winding assembly 90A, the crossover connection portions have an extremely simple construction. Thus, the operations of pulling around and bending the strands of wire 30 to form the crossover connections can be significantly alleviated, greatly improving the connection operation.

Because the same-address crossover connections ($C_{1-1}$) of each phase within each of the three-phase alternating-current windings 160 are disposed at a pitch of eight slots from each other, the same-address crossover connection of each phase can be positioned without contacting each other, thus improving the connection operation and enabling increases in the height of the coil ends to be suppressed.

Thus, because the first to fourth winding sub-portions 31 to 34 constituting the stator winding 16 are each composed of one strand of wire 30 (continuous wire), it is not necessary to insert a large number of short conductor segments 54 into the stator core 51 and join end portions 54b to each other by welding, soldering, etc., as was required in the conventional stator 50, enabling the productivity of the stator 8 to be improved significantly.

Because the coil ends are constituted by the turn portions 30a of the strands of wire 30, the only joints in the coil end groups 16a and 16b are the first and second end portions of the first to fourth winding sub-portions 31 to 34 and the crossover connection joint portions, significantly reducing the number of joints. Thus, because the occurrence of short-circuiting accidents which accompany loss of insulation due to the joining process can be suppressed, superior insulation can be obtained and high yield can also be achieved. In addition, reductions in resistance to corrosion which accompany loss of insulation due to joining can be suppressed.

Because the strands of wire 30 are formed with a rectangular cross section, the contact surface area at the joint portions can be increased, achieving greater joint strength and thereby improving reliability.

Because the joint portions are formed by arc-welding, achieving joint strength and thereby improving reliability.

Because the same-address crossover connections are formed using the metal crossover connection terminals 102, clamps for securing the end portions of the winding sub-portions being crossover connected are no longer required, enabling the number of parts to be reduced. Furthermore, the length of the end portions of the winding sub-portions can be shortened, enabling the operations of pulling around and bending the end portions of the winding sub-portions to be significantly alleviated.

Because the neutral points of each phase are formed using the metal neutral-point connection terminal 101, clamps for securing the end portions of the winding sub-portions constituting the neutral points are no longer required, enabling the number of parts to be reduced. Furthermore, the length of the end portions of the winding sub-portions constituting the neutral points can be shortened, enabling the operations of pulling around and bending the end portions of the winding sub-portions to be significantly alleviated.

Because the neutral-point leads 101b are disposed in the metal neutral-point connection terminals 101, there is no need to provide separate leads for outputting neutral-point current from the three-phase alternating-current windings 160, enabling the connection operation to be improved.

Because the metal neutral-point connection terminal 101 and the metal crossover connection terminals 102 are integrated by the electrically-insulative resin 103, the process of positioning the terminals in the alternating-current connecting operation of one three-phase alternating-current winding 160 only needs to be performed once, enabling a reduction in the number of operations.

Because the two winding assemblies 90A and 90B which are composed of continuous wire can be lined up in two rows and inserted into the slots 15a of the stator core 15, assembly is significantly improved compared to the conventional art in which a large number of conductor segments 54 are inserted into the slots separately.

Increases in the number of turns in the stator winding can be easily adapted for by lining up the straight portions 30b of the winding assemblies 90A and 90B which are composed of continuous strands of wire relative to one another and installing them so that they stack up on top of each other.

The stator 8 according to Embodiment 1 can be prepared by inserting the winding assemblies 90A and 90B which are composed of continuous wire into the slots 36a in the parallelepiped core 36 through the opening portions 36b and then rolling the parallelepiped core 36 into an annular shape. Thus, because the open dimensions of the opening portions 36b of the slots 36a can be made larger than the dimensions of the strands of wire 30 in the width direction of the slots, the operation of inserting the winding assemblies 90A and 90B is improved. Furthermore, because the open dimensions of the opening portions 36b of the parallelepiped core 36 can be made smaller than the dimensions of the strands of wire 30 in the width direction of the slots when the parallelepiped core 36 is rolled up, the space factor is increased, enabling output to be improved. In addition, even if the number of slots is increased, the productivity of the stator will not deteriorate. Furthermore, because there is no need to push the strands of wire 30 into the slots 15a along the axial direction of the stator core 15 as was the case with the conductor segments 54, damage to the insulative coating on the strands of wire 30 does not occur easily, enabling high yield to be realized.

The effects achieved by installing the stator 8 constructed in the above manner into an alternator will be described below.

Because the coil ends are constituted by the turn portions 30a of the strands of wire 30, the number of joints in the coil end groups 16a and 16b is significantly reduced. Thus, the conductors are not softened by welding, raising the rigidity of the stator as a whole and enabling magnetic noise to be reduced.

The coil end groups 16a and 16b are constructed by arranging the turn portions 30a in rows circumferentially. Thus, compared to the conventional coil end groups in which the end portions 54b of the conductor segments 54 were joined to each other, the height to which the coil end groups extend outwards from the stator core 15 can be reduced. Thus, wind resistance in the coil end groups 16a and 16b is reduced, enabling the reduction of wind noise due to the rotation of the rotor 7. Coil leakage reactance in the coil ends is also reduced, improving output and efficiency.

Four strands of wire 30 are arranged so as to line up in a row radially within each slot 15a, and the turn portions 30a are arranged to line up in two rows circumferentially. Thus, the turn portions 30a constituting the coil end groups 16a and 16b are each divided into two rows radially, enabling the height to which the coil end groups 16a and 16b extend outwards from the stator core 15 to be reduced. As a result, wind resistance in the coil end groups 16a and 16b is reduced, enabling the reduction of wind noise due to the rotation of the rotor 7.

The turn portions 30a which fold back at the end surfaces of the stator core 15 each connect two straight portions 30b disposed in different layers in different slots 15a six slots apart. Thus, because interference between the coil ends in each phase is suppressed and the space factor of the stator winding is increased, increased output can be achieved. Furthermore, each of the turn portions 30a can be easily formed into a generally identical shape. Because circumferential irregularities on radially inner edge surfaces of the coil end groups 16a and 16b can be suppressed by forming each of the turn portions 30a into a generally identical shape, that is, by forming the turn portions 30a which constitute the coil end groups 16a and 16b into a generally identical shape circumferentially, wind noise generated between the rotor 7 and the coil end groups 16a and 16b can be reduced. Furthermore, leak inductance becomes uniform, stabilizing output. Furthermore, because the turn portions 30a are spaced in the circumferential direction, and the spaces between the turn portions 30a in the circumferential direction are formed to be generally identical, the passage of cooling air inside the coil end groups 16a and 16b is facilitated, improving cooling and reducing noise due to interference between the cooling air and the coil ends.

Because the turn portions 30a are formed with a generally identical shape and arranged in rows in the circumferential direction, heat dissipation from each of the turn portions 30a is even, and in addition, heat dissipation from each of the coil end groups 16a and 16b is also even. Thus, heat generated in the stator winding 16 is radiated uniformly from each of the turn portions 30a and radiated uniformly from both coil end groups 16a and 16b, improving the cooling of the stator winding 16.

Because the open dimensions of the opening portions 15b of the slots 15a are constructed so as to be smaller than the dimensions of the strands of wire 30 in the width direction of the slots 15a, the strands of wire 30 are prevented from popping out of the slots 15a towards the radial inside, and noise at the opening portions 15b due to interference with the rotor 7 can be reduced.

Because the straight portions 30b are formed with a rectangular cross section, the cross-sectional shape of the straight portions 30b fits neatly into the shape of the slots 15a when the straight portions 30b are housed inside the slots 15a. Thus, the space factor of the strands of wire 30 inside the slots 15a is easily increased, enabling improved transfer of heat from the strands of wire 30 to the stator core 15. Because the strands of wire 30 are formed with a rectangular cross section, the surface area radiating heat from the turn portions 30a constituting the coil ends is increased, efficiently radiating heat generated by the stator winding 16. In addition, by disposing the long sides of the rectangular cross section parallel to the radial direction, gaps can be ensured between the turn portions 30b, making it possible for the cooling air to pass inside the coil end groups 16a and 16b and reducing wind resistance in the radial direction. Here in Embodiment 1, the strands of wire 30 are formed into a rectangular cross section, but the cross-sectional shape of the strands of wire 30 is not limited to a rectangular cross section and may be any generally flattened shape such as an elongated elliptical shape in which the short sides of a rectangle are made into arcs, or an oblong shape, etc.

The rotor 7 has sixteen magnetic poles, and ninety-six (96) slots 15a are formed at even pitch in the stator core 15. In other words, because the number of slots housing the stator winding 16 is two per pole per phase, and there are two three-phase alternating-current windings 160 disposed so as to have a mutual phase difference, the magnetomotive wave form can be made to approximate a sinusoidal wave, reducing higher harmonic wave components and enabling the achievement of stable output.

As shown in FIG. 7, the two three-phase alternating-current windings 160 are constructed by forming three stator winding phase portions 161 into each of two star connections, each of the three stator winding phase portions 161 being constructed by connecting the first to fourth winding sub-portions 31 to 34 in series, each of these two three-phase alternating-current windings 160 is connected to its own rectifier 12, and in addition, the outputs from the two rectifiers 12 are connected in parallel. Thus, the direct current outputs of the two three-phase alternating-current windings 160 can be combined and extracted, solving the problem of insufficient power generation in low rotational frequency regions.

Because the neutral points (N) of the three-phase alternating-current windings 160 are connected to the output terminals of the rectifiers 12 through diodes 29, large fluctuations in neutral-point voltage can be effectively used to enable improved output in regions where the rotational speed exceeds 2000 rpm, especially in excess of 2500 rpm.

Because the height of the coil end groups 16a and 16b is low and there are not many joint portions, noise caused by interference between the coil end groups 16a and 16b and the cooling airflow formed by the fans 5 due to rotation of the rotor 7 is reduced. Because the shape of both coil end groups 16a and 16b is generally identical and the fans 5 are disposed on both ends of the rotor 7, the coil end groups 16a and 16b are cooled in a balanced manner, reducing the temperature of the stator winding uniformly and greatly.

Now, the fans 5 do not have to be disposed on both ends of the rotor 7, they may be disposed in consideration of the stator winding or the positions of the rectifiers which are large heat-generating bodies. For example, the coil ends of the stator winding which are large heat generating bodies can be disposed on the discharge side of a fan with a large cooling speed, and a fan disposed on an end portion of the rotor at the end where the rectifiers are disposed. Furthermore, when mounted to an automotive engine, because the pulley is normally connected to a crankshaft by means of a belt, the fan may be disposed at the end away from the pulley so that the cooling exhaust from the fan does not affect the belt. Moreover, shoulder portions of the claw-shaped magnetic poles of the rotor have a wind conveying action and can be used as a cooling means.

Because the direction of inclination of the strands of wire 30 constituting the inner circumferential side of the coil end group 16a is parallel to the direction of inclination of the strands of wire 30 constituting the inner circumferential side of the coil end group 16b, axial flow of cooling air through the case 3 turns along the direction of inclination of the strands of wire 30. Thus, the axial airflow generated by the rotation of the rotor 7 is controlled.

In other words, if the strands of wire 30 constituting the inner circumferential side of the coil end groups 16a and 16b are inclined along the direction resulting from the combination of a component of the cooling airflow in a direction of rotation of the rotor 7 and a component of the axial flow of the cooling air, axial flow of the cooling air is promoted. Thus, because the rotor coil 13 is efficiently cooled, the temperature of the rotor coil 13 decreases, enabling the field current to be increased and output improved. In that case, because the strands of wire 30 constituting the inner circumferential side of the coil end groups 16a and 16b are inclined along the component of the axial flow of cooling air, wind noise due to interference is also reduced.

On the other hand, if the strands of wire 30 constituting the inner circumferential side of the coil end groups 16a and 16b are inclined along the direction resulting from the combination of a component of the cooling airflow in a direction of rotation of the rotor 7 and a component against the axial flow of the cooling air, axial flow of the cooling air is reduced. Thus, the amount of air discharged radially is increased, improving the cooling of the coil ends disposed on the discharge side.

Because the axial length of the stator 8, including the coil ends, is shorter than the pole cores 20 and 21, compactness can be achieved. When fans 5 are disposed on both end portions of the rotor 7, because there are no coil ends on the discharge side of the fans, wind resistance is significantly reduced, thereby reducing wind noise and suppressing temperature increases in internal parts requiring cooling, such as the rectifiers 12.

Moreover, in Embodiment 1 above, the metal neutral-point connection terminals 101 and the metal crossover connection terminals 102 are integrated by electrically-insulative resin 103, but it is not necessary for the terminals 101 and 102 to be integrated. In that case, the fact that there are more terminals to position is a disadvantage, but the other effects can still be achieved.

Furthermore, in Embodiment 1 above, the same-address crossover connections of each phase are disposed at a pitch of eight slots circumferentially, but mutual contact can be avoided if the same-address crossover connections of each phase are disposed at a pitch of 4n or more, where n is the number of slots per pole per phase.

Embodiment 2

Figure 17:
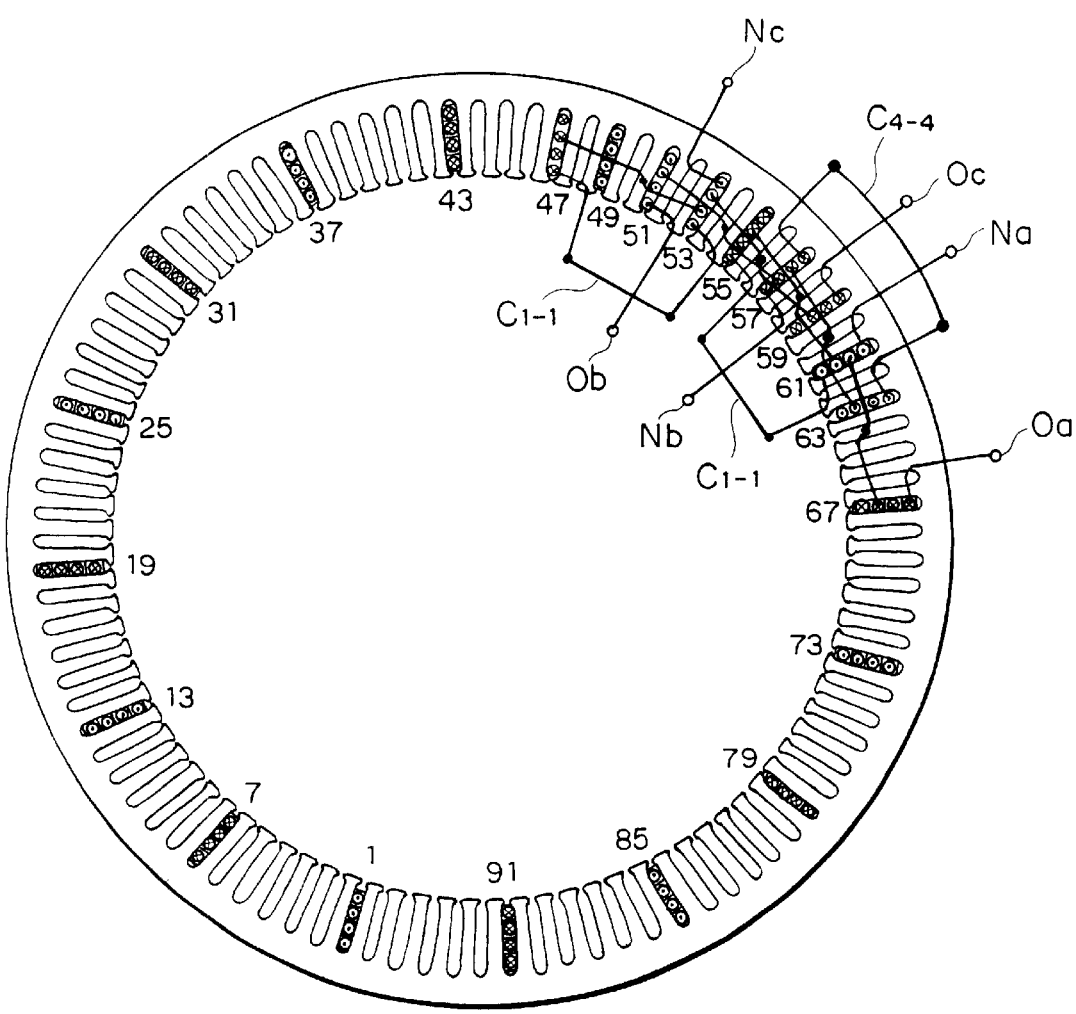
FIG. 17 is an end elevation explaining connections among three stator winding phase portions in an automotive alternator according to Embodiment 2 of the present invention.

FIG. 17 is an end elevation explaining connections among three stator winding phase portions in an automotive alternator according to Embodiment 2 of the present invention;

In FIG. 17, in the wire-strand groups wound into a slot group including slot numbers 1, 7, . . . , and 91, a crossover connection (adjacent-address crossover connection $C_{2-3}$) is formed between a second end portion 31b of the first winding sub-portion 31 extending outwards from the second address of slot number 67 and a first end portion 33a of the third winding sub-portion 33 extending outwards from the third address of slot number 61, and a crossover connection (adjacent-address crossover connection $C_{2-3}$) is formed between a second end portion 32b of the second winding sub-portion 32 extending outwards from the second address of slot number 61 and a first end portion 34a of the fourth winding sub-portion 34 extending outwards from the third address of slot number 55, and in addition, a crossover connection (same-address crossover connection $C_{1-1}$) is formed between a first end portion 31a of the first winding sub-portion 31 extending outwards from the first address of slot number 61 and a first end portion 32a of the second winding sub-portion 32 extending outwards from the first address of slot number 55. Thus, the first to fourth winding sub-portions 31 to 34 are connected in series to form one stator winding phase portion 161 having four turns, namely, the stator winding a-phase portion.

At this time, a second end portion 33b of the third winding sub-portion 33 extending outwards from the fourth address of slot number 67 and a second end portion 34b of the fourth winding sub-portion 34 extending outwards from the fourth address of slot number 61 become an output wire (Oa) and a neutral point (Na), respectively, of the stator winding a-phase portion.

Similarly, in the wire-strand groups wound into a slot group including slot numbers 3, 9, . . . , and 93, a crossover connection (adjacent-address crossover connection $C_{2-3}$) is formed between a second end portion 32b of the second winding sub-portion 32 extending outwards from the second address of slot number 63 and a first end portion 34a of the fourth winding sub-portion 34 extending outwards from the third address of slot number 57, and a crossover connection (adjacent-address crossover connection $C_{2-3}$) is formed between a second end portion 31b of the first winding sub-portion 31 extending outwards from the second address of slot number 57 and a first end portion 33a of the third winding sub-portion 33 extending outwards from the third address of slot number 51, and in addition, a crossover connection (same-address crossover connection $C_{4-4}$) is formed between a second end portion 34b of the fourth winding sub-portion 34 extending outwards from the fourth address of slot number 63 and a second end portion 33b of the third winding sub-portion 33 extending outwards from the fourth address of slot number 57. Thus, the first to fourth winding sub-portions 31 to 34 are connected in series to form a stator winding b-phase portion having four turns. A first end portion 31a of the first winding sub-portion 31 extending outwards from the first address of slot number 51 and a first end portion 32a of the second winding sub-portion 32 extending outwards from the first address of slot number 57 become an output wire (Ob) and a neutral point (Nb), respectively, of the stator winding b-phase portion.

In addition, in the wire-strand groups wound into a slot group including slot numbers 5, 11, ..., and 95, a crossover connection (adjacent-address crossover connection $C_{2-3}$) is formed between a second end portion 31b of the first winding sub-portion 31 extending outwards from the second address of slot number 59 and a first end portion 33a of the third winding sub-portion 33 extending outwards from the third address of slot number 53, and a crossover connection (adjacent-address crossover connection $C_{2-3}$) is formed between a second end portion 32b of the second winding sub-portion 32 extending outwards from the second address of slot number 53 and a first end portion 34a of the fourth winding sub-portion 34 extending outwards from the third address of slot number 47, and in addition, a crossover connection (same-address crossover connection $C_{1-1}$) is formed between a first end portion 31a of the first winding sub-portion 31 extending outwards from the first address of slot number 53 and a first end portion 32a of the second winding sub-portion 32 extending outwards from the first address of slot number 47. Thus, the first to fourth winding sub-portions 31 to 34 are connected in series to form a stator winding c-phase portion having four turns. A second end portion 33b of the third winding sub-portion 33 extending outwards from the fourth address of slot number 59 and a second end portion 34b of the fourth winding sub-portion 34 extending outwards from the fourth address of slot number 53 become an output wire (Oc) and a neutral point (Nc), respectively, of the stator winding c-phase portion.

The same-address crossover connections $C_{1-1}$ in the stator winding a-phase portion and the stator winding c-phase portion are in the first address, and the same-address crossover connection $C_{4-4}$ in the stator winding b-phase portion is in the fourth address. The same-address crossover connections in each phase are disposed at a pitch of four slots from each other. The three output wires Oa, Ob, and Oc are also disposed at a pitch of four slots from each other, and in addition the three neutral points Na, Nb, and Nc are also disposed at a pitch of four slots from each other.

In the wire-strand groups wound into a slot group including slot numbers 2, 8, ..., and 92, a stator winding a'-phase portion is formed by similarly connecting each of the strands of wire 30, in the wire-strand groups wound into a slot group including slot numbers 4, 10, ..., and 94, a stator winding b'-phase portion is formed by similarly connecting each of the strands of wire 30, and in the wire-strand groups wound into a slot group including slot numbers 6, 12, ..., and 96, a stator winding c'-phase portion is formed by similarly connecting each of the strands of wire 30.

Moreover, the rest of the construction is the same as in Embodiment 1 above.

In Embodiment 2, because the same-address crossover connections in each phase of the three-phase alternating-current windings are formed in addresses different from adjacent phases and are disposed at a pitch of four slots, the connecting operation is improved and increases in the height of the coil ends can be suppressed.

Furthermore, because the same-address crossover connections in each phase of the three-phase alternating-current windings are disposed at a pitch of four slots, the connecting operation area is more concentrated than in Embodiment 1 above, enabling the connecting operation to be improved.

Moreover, in Embodiment 2 above, the same-address crossover connections of each phase are disposed at a pitch of four slots circumferentially, but mutual contact can be avoided if the same-address crossover connections in each phase of the three-phase alternating-current windings are formed in different addresses from adjacent phases and same-address crossover connections of each phase are disposed at a pitch of 2n or more, where n is the number of slots per pole per phase.

Embodiment 3

Figure 18:
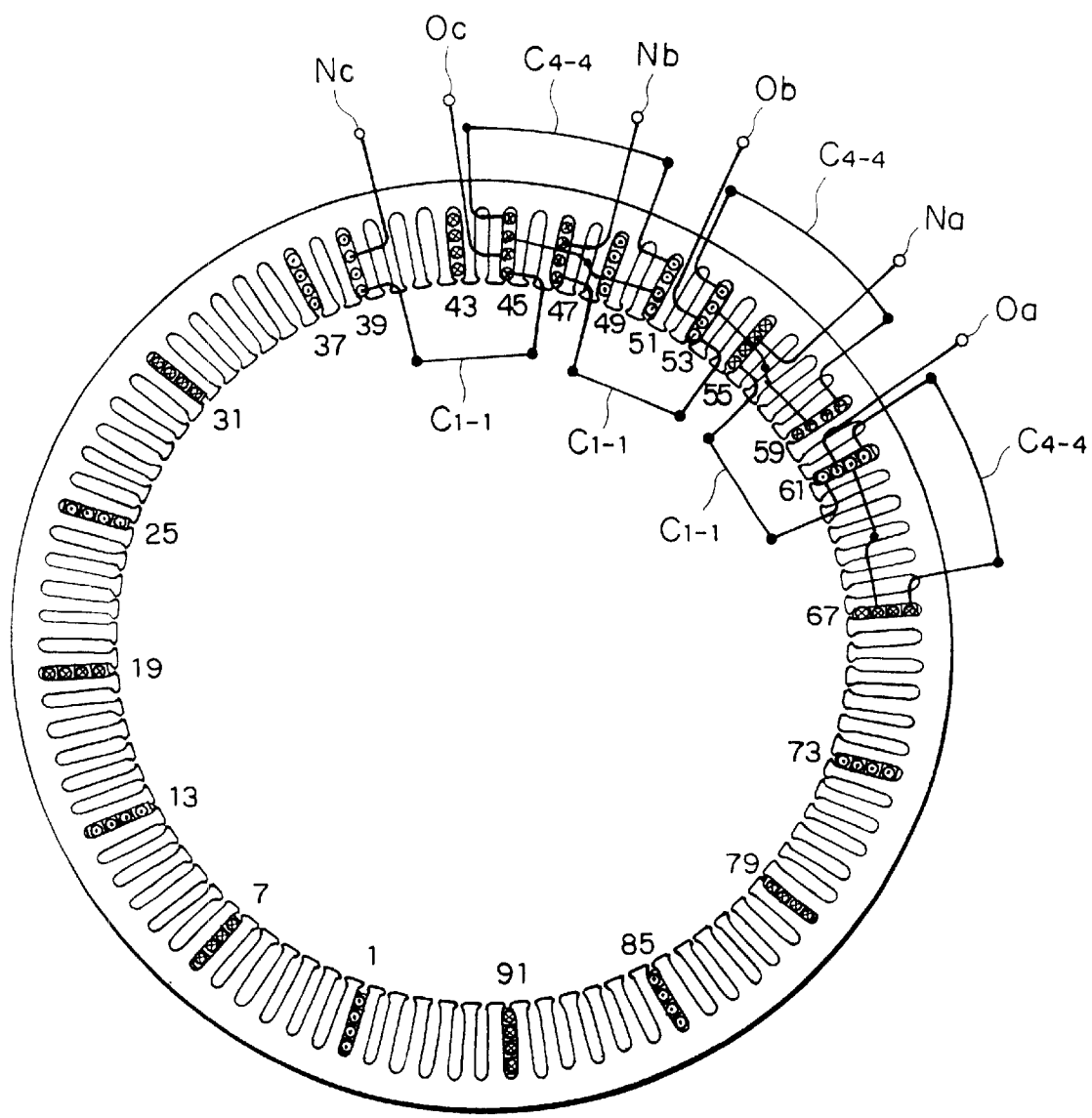
FIG. 18 is an end elevation explaining connections among three stator winding phase portions in an automotive alternator according to Embodiment 3 of the present invention.

FIG. 18 is an end elevation explaining connections among three stator winding phase portions in an automotive alternator according to Embodiment 3 of the present invention;

In FIG. 18, in the wire-strand groups wound into a slot group including slot numbers 1, 7, ..., and 91, a crossover connection (adjacent-address crossover connection $C_{2-3}$) is formed between a second end portion 31b of the first winding sub-portion 31 extending outwards from the second address of slot number 67 and a first end portion 33a of the third winding sub-portion 33 extending outwards from the third address of slot number 61, and a crossover connection (same-address crossover connection $C_{4-4}$) is formed between a second end portion 33b of the third winding sub-portion 33 extending outwards from the fourth address of slot number 67 and a second end portion 34b of the fourth winding sub-portion 34 extending outwards from the fourth address of slot number 61, and in addition, a crossover connection (same-address crossover connection $C_{1-1}$) is formed between a first end portion 31a of the first winding sub-portion 31 extending outwards from the first address of slot number 61 and a first end portion 32a of the second winding sub-portion 32 extending outwards from the first address of slot number 55. Thus, the first to fourth winding sub-portions 31 to 34 are connected in series to form one stator winding phase portion 161 having four turns, namely, the stator winding a-phase portion.

At this time, a second end portion 32b of the second winding sub-portion 32 extending outwards from the second address of slot number 61 and a first end portion 34a of the fourth winding sub-portion 34 extending outwards from the third address of slot number 55 become an output wire (Oa) and a neutral point (Na), respectively, of the stator winding a-phase portion.

Similarly, in the wire-strand groups wound into a slot group including slot numbers 5, 11, ..., and 95, a crossover connection (adjacent-address crossover connection $C_{2-3}$) is formed between a second end portion 31b of the first winding sub-portion 31 extending outwards from the second address of slot number 59 and a first end portion 33a of the third winding sub-portion 33 extending outwards from the third address of slot number 53, and a crossover connection (same-address crossover connection $C_{4-4}$) is formed between a second end portion 33b of the third winding sub-portion 33 extending outwards from the fourth address of slot number 59 and a second end portion 34b of the fourth winding sub-portion 34 extending outwards from the fourth address of slot number 53, and in addition, a crossover connection (same-address crossover connection $C_{1-1}$) is formed between a first end portion 31a of the first winding sub-portion 31 extending outwards from the first address of slot number 53 and a first end portion 32a of the second winding sub-portion 32 extending outwards from the first address of slot number 47. Thus, the first to fourth winding sub-portions 31 to 34 are connected in series to form a stator winding b-phase portion having four turns. A second end portion 32b of the second winding sub-portion 32 extending outwards from the second address of slot number 53 and a first end portion 34a of the fourth winding sub-portion 34 extending outwards from the third address of slot number 47 become an output wire (Ob) and a neutral point (Nb), respectively, of the stator winding b-phase portion.

Similarly, in the wire-strand groups wound into a slot group including slot numbers 3, 9, ..., and 93, a crossover connection (adjacent-address crossover connection $C_{2-3}$) is formed between a second end portion 32b of the second winding sub-portion 32 extending outwards from the second address of slot number 51 and a first end portion 34a of the fourth winding sub-portion 34 extending outwards from the third address of slot number 45, and a crossover connection (same-address crossover connection $C_{4-4}$) is formed between a second end portion 34b of the fourth winding sub-portion 34 extending outwards from the fourth address of slot number 51 and a second end portion 33b of the third winding sub-portion 33 extending outwards from the fourth address of slot number 45, and in addition, a crossover connection (same-address crossover connection $C_{1-1}$) is formed between a first end portion 32a of the second winding sub-portion 32 extending outwards from the first address of slot number 45 and a first end portion 31a of the first winding sub-portion 31 extending outwards from the first address of slot number 39. Thus, the first to fourth winding sub-portions 31 to 34 are connected in series to form a stator winding c-phase portion having four turns. A second end portion 31b of the first winding sub-portion 31 extending outwards from the second address of slot number 45 and a first end portion 33a of the third winding sub-portion 33 extending outwards from the third address of slot number 39 become an output wire (Oc) and a neutral point (Nc), respectively, of the stator winding c-phase portion.

In the stator winding a-phase portion, the stator winding b-phase portion, and the stator winding c-phase portion of the above construction, two same-address crossover connections $C_{1-1}$ and $C_{4-4}$ are provided in each phase. The same-address crossover connections $C_{1-1}$ are disposed at a pitch of eight slots from each other, and the same-address crossover connections $C_{4-4}$ are disposed at a pitch of eight slots from each other. The three output wires Oa, Ob, and Oc are also disposed at a pitch of eight slots from each other, and in addition the three neutral points Na, Nb, and Nc are also disposed at a pitch of eight slots from each other.

In the wire-strand groups wound into a slot group including slot numbers 2, 8, ..., and 92, a stator winding a'-phase portion is formed by similarly connecting each of the strands of wire 30, in the wire-strand groups wound into a slot group including slot numbers 6, 12, ..., and 96, a stator winding b'-phase portion is formed by similarly connecting each of the strands of wire 30, and in the wire-strand groups wound into a slot group including slot numbers 4, 10, ..., and 94, a stator winding c'-phase portion is formed by similarly connecting each of the strands of wire 30.

Moreover, the rest of the construction is the same as in Embodiment 1 above.

Consequently, in Embodiment 3, because the same-address crossover connections of each phase of the three-phase alternating-current winding are disposed at a pitch of eight slots, the same-address crossover connections can also be positioned without coming into contact with each other.

Embodiment 4

Figure 19:
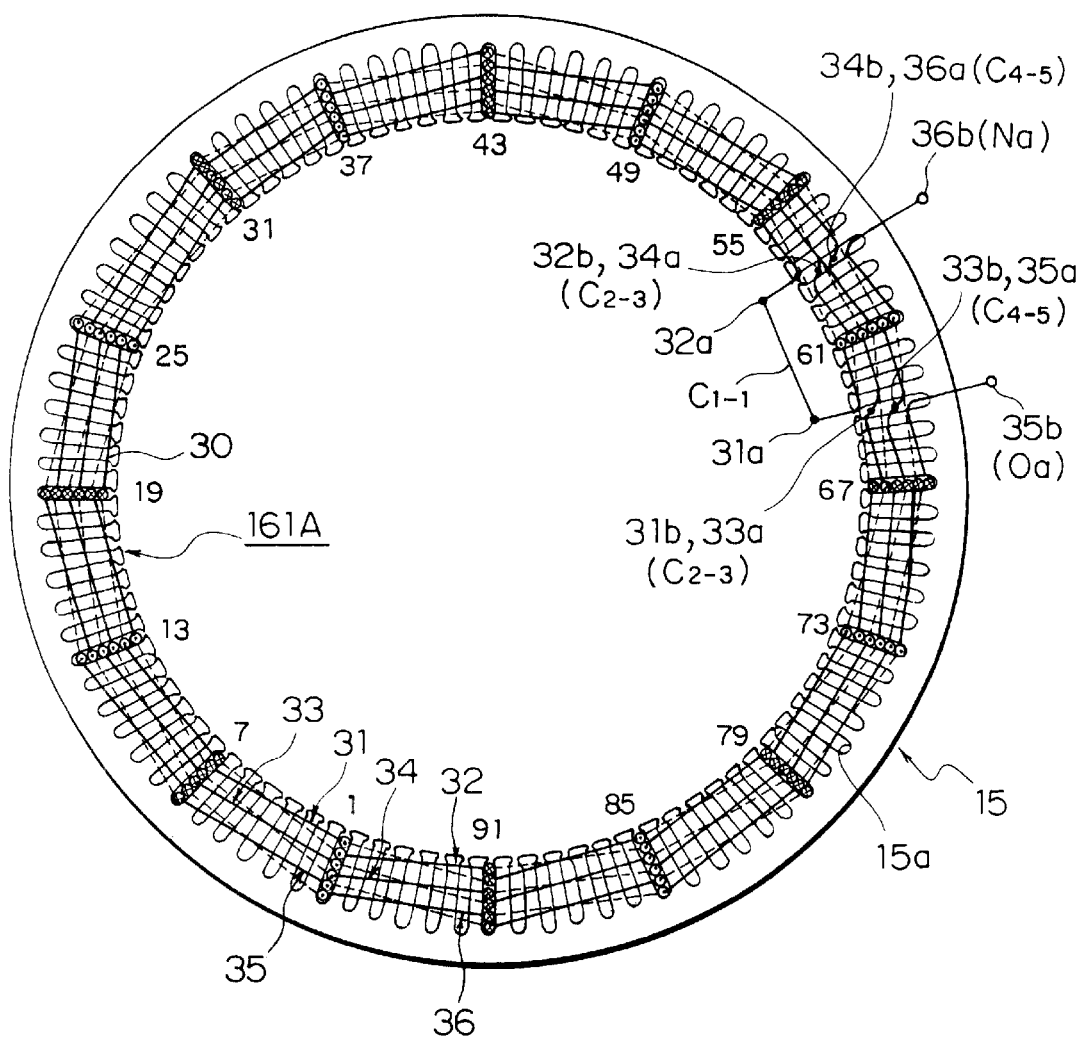
FIG. 19 is an end elevation explaining connections in one stator winding phase portion in an automotive alternator according to Embodiment 4 of the present invention.

FIG. 19 is an end elevation explaining connections in one stator winding phase portion in an automotive alternator according to Embodiment 4 of the present invention.

In FIG. 19, one stator winding phase portion 161A is composed of first to sixth winding sub-portions 31 to 36 each formed from one strand of wire 30. The first winding sub-portion 31 is formed by wave winding one strand of wire 30 into every sixth slot from slot numbers 1 to 91 so as to alternately occupy the first address and the second address inside the slots 15a. The second winding sub-portion 32 is formed by wave winding a strand of wire 30 into every sixth slot from slot numbers 1 to 91 so as to alternately occupy the second address and the first address inside the slots 15a. The third winding sub-portion 33 is formed by wave winding a strand of wire 30 into every sixth slot from slot numbers 1 to 91 so as to alternately occupy the third address and the fourth address inside the slots 15a. The fourth winding sub-portion 32 is formed by wave winding a strand of wire 30 into every sixth slot from slot numbers 1 to 91 so as to alternately occupy the fourth address and the third address inside the slots 15a. The fifth winding sub-portion 35 is formed by wave winding a strand of wire 30 into every sixth slot from slot numbers 1 to 91 so as to alternately occupy a fifth address and a sixth address inside the slots 15a. The sixth winding sub-portion 36 is formed by wave winding a strand of wire 30 into every sixth slot from slot numbers 1 to 91 so as to alternately occupy the sixth address and the fifth address inside the slots 15a.

Thus, each of the first to sixth winding sub-portions 31 to 36 constitutes a winding sub-portion having one turn in which a single strand of wire 30 is wound into every sixth slot 15a so as to alternately occupy an inner layer and an outer layer in a slot depth direction.

At a first end of the stator core 15, a crossover connection (adjacent-address crossover connection $C_{2-3}$) is formed between a second end portion 31b of the first winding sub-portion 31 extending outwards from the second address of slot number 67 and a first end portion 33a of the third winding sub-portion 33 extending outwards from the third address of slot number 61, a crossover connection (adjacent-address crossover connection $C_{4-5}$) is formed between a second end portion 33b of the third winding sub-portion 33 extending outwards from the fourth address of slot number 67 and a first end portion 35a of the fifth winding sub-portion 35 extending outwards from the fifth address of slot number 61, a crossover connection (adjacent-address crossover connection $C_{2-3}$) is formed between a second end portion 32b of the second winding sub-portion 32 extending outwards from the second address of slot number 61 and a first end portion 34a of the fourth winding sub-portion 34 extending outwards from the third address of slot number 55, and in addition, a crossover connection (adjacent-address crossover connection $C_{4-5}$) is formed between a second end portion 34b of the fourth winding sub-portion 34 extending outwards from the fourth address of slot number 61 and a first end portion 36a of the sixth winding sub-portion 36 extending outwards from the fifth address of slot number 55, and in addition, a crossover connection (same-address crossover connection $C_{1-1}$) is formed between a first end portion 31a of the first winding sub-portion 31 extending outwards from the first address of slot number 61 and a first end portion 32a of the second winding sub-portion 32 extending outwards from the first address of slot number 55. Thus, the first to sixth winding sub-portions 31 to 36 are connected in series to form one stator winding phase portion 161A having six turns, namely, the stator winding a-phase portion.

At this time, a second end portion 35b of the fifth winding sub-portion 35 extending outwards from the sixth address of slot number 67 and a second end portion 36b of the sixth winding sub-portion 36 extending outwards from the sixth address of slot number 61 become an output wire (Oa) and a neutral point (Na), respectively, of one stator winding phase portion 161A.

Figure 20:
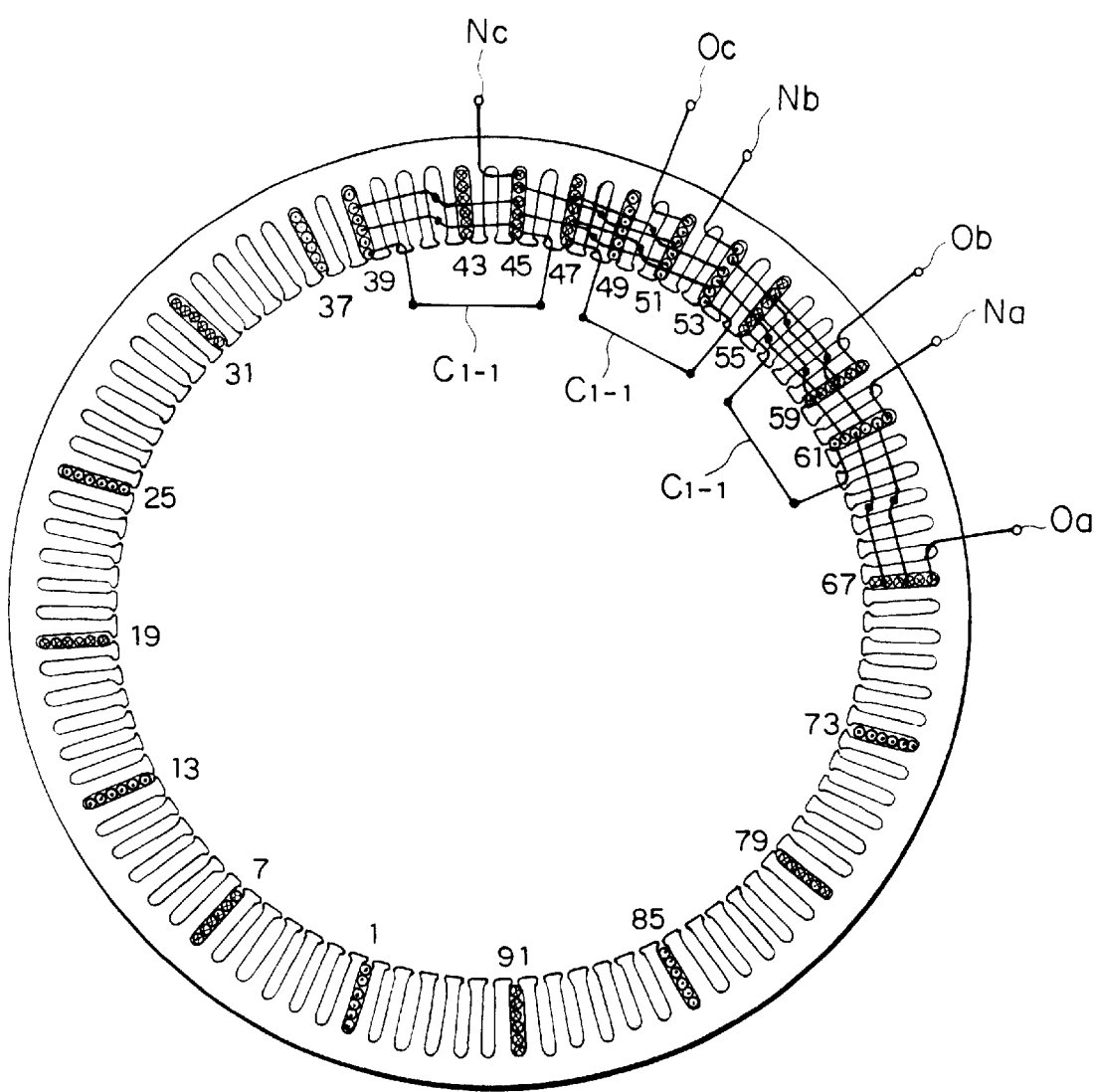
FIG. 20 is an end elevation explaining connections among three stator winding phase portions in the automotive alternator according to Embodiment 4 of the present invention.

In addition, in the wire-strand groups wound into a slot group including slot numbers 5, 11, . . . , and 95, as shown in FIG. 20, a crossover connection (adjacent-address crossover connection $C_{2-3}$) is formed between a second end portion 31b of the first winding sub-portion 31 extending outwards from the second address of slot number 59 and a first end portion 33a of the third winding sub-portion 33 extending outwards from the third address of slot number 53, and a crossover connection (adjacent-address crossover connection $C_{4-5}$) is formed between a second end portion 33b of the third winding sub-portion 33 extending outwards from the fourth address of slot number 59 and a first end portion 35a of the fifth winding sub-portion 35 extending outwards from the fifth address of slot number 53, a crossover connection (adjacent-address crossover connection $C_{2-3}$) is formed between a second end portion 32b of the second winding sub-portion 32 extending outwards from the second address of slot number 53 and a first end portion 34a of the fourth winding sub-portion 34 extending outwards from the third address of slot number 47, and in addition, a crossover connection (adjacent-address crossover connection $C_{4-5}$) is formed between a second end portion 34b of the fourth winding sub-portion 34 extending outwards from the fourth address of slot number 53 and a first end portion 36a of the sixth winding sub-portion 36 extending outwards from the fifth address of slot number 47, and in addition, a crossover connection (same-address crossover connection $C_{1-1}$) is formed between a first end portion 31a of the first winding sub-portion 31 extending outwards from the first address of slot number 53 and a first end portion 32a of the second winding sub-portion 32 extending outwards from the first address of slot number 47. Thus, the first to sixth winding sub-portions 31 to 36 are connected in series to form a stator winding b-phase portion having six turns.

At this time, a second end portion 35b of the fifth winding sub-portion 35 extending outwards from the sixth address of slot number 59 and a second end portion 36b of the sixth winding sub-portion 36 extending outwards from the sixth address of slot number 53 become an output wire (Ob) and a neutral point (Nb), respectively, of the stator winding b-phase portion.

In addition, in the wire-strand groups wound into a slot group including slot numbers 3, 9, . . . , and 93, as shown in FIG. 20, a crossover connection (adjacent-address crossover connection $C_{2-3}$) is formed between a second end portion 32b of the second winding sub-portion 32 extending outwards from the second address of slot number 51 and a first end portion 34a of the fourth winding sub-portion 34 extending outwards from the third address of slot number 45, a crossover connection (adjacent-address crossover connection $C_{4-5}$) is formed between a second end portion 34b of the fourth winding sub-portion 34 extending outwards from the fourth address of slot number 51 and a first end portion 36a of the sixth winding sub-portion 36 extending outwards from the fifth address of slot number 45, and a crossover connection (adjacent-address crossover connection $C_{2-3}$) is formed between a second end portion 31b of the first winding sub-portion 31 extending outwards from the second address of slot number 45 and a first end portion 33a of the third winding sub-portion 33 extending outwards from the third address of slot number 39, a crossover connection (adjacent-address crossover connection $C_{4-5}$) is formed between a second end portion 33b of the third winding sub-portion 33 extending outwards from the fourth address of slot number 45 and a first end portion 35a of the fifth winding sub-portion 35 extending outwards from the fifth address of slot number 39, and in addition, a crossover connection (same-address crossover connection $C_{1-1}$) is formed between a first end portion 32a of the second winding sub-portion 32 extending outwards from the first address of slot number 45 and a first end portion 31a of the first winding sub-portion 31 extending outwards from the first address of slot number 39. Thus, the first to sixth winding sub-portions 31 to 36 are connected in series to form a stator winding c-phase portion having six turns.

At this time, a second end portion 36b of the sixth winding sub-portion 36 extending outwards from the sixth address of slot number 51 and a second end portion 35b of the fifth winding sub-portion 35 extending outwards from the sixth address of slot number 45 become an output wire (Oc) and a neutral point (Nc), respectively, of the stator winding c-phase portion.

In the wire-strand groups wound into a slot group including slot numbers 2, 8, . . . , and 92, a stator winding a'-phase portion is formed by similarly connecting each of the strands of wire 30, in the wire-strand groups wound into a slot group including slot numbers 6, 12, . . . , and 96, a stator winding b'-phase portion is formed by similarly connecting each of the strands of wire 30, and in the wire-strand groups wound into a slot group including slot numbers 4, 10, . . . , and 94, a stator winding c'-phase portion is formed by similarly connecting each of the strands of wire 30.

Moreover, the rest of the construction is the same as in Embodiment 1 above.

In Embodiment 4, two winding assemblies 90A and one winding assembly 90B are installed in the stator core 15 in three rows in a radial direction. Connections are made between the winding sub-portions in one winding assembly 90A by one same-address crossover connection ($C_{1-1}$), and connections are made between adjacent winding assemblies 90A and between the winding assemblies 90A and 90B by four adjacent-address crossover connections ($C_{2-3}$, $C_{4-5}$) to form one stator winding phase portion 161A having six turns. The same-address crossover connections ($C_{1-1}$) in each phase of the three-phase alternate-current windings are disposed at a pitch of eight slots from each other. Thus, the same effects can be achieved in Embodiment 4 as in Embodiment 1 above.

Embodiment 5

Figure 21:
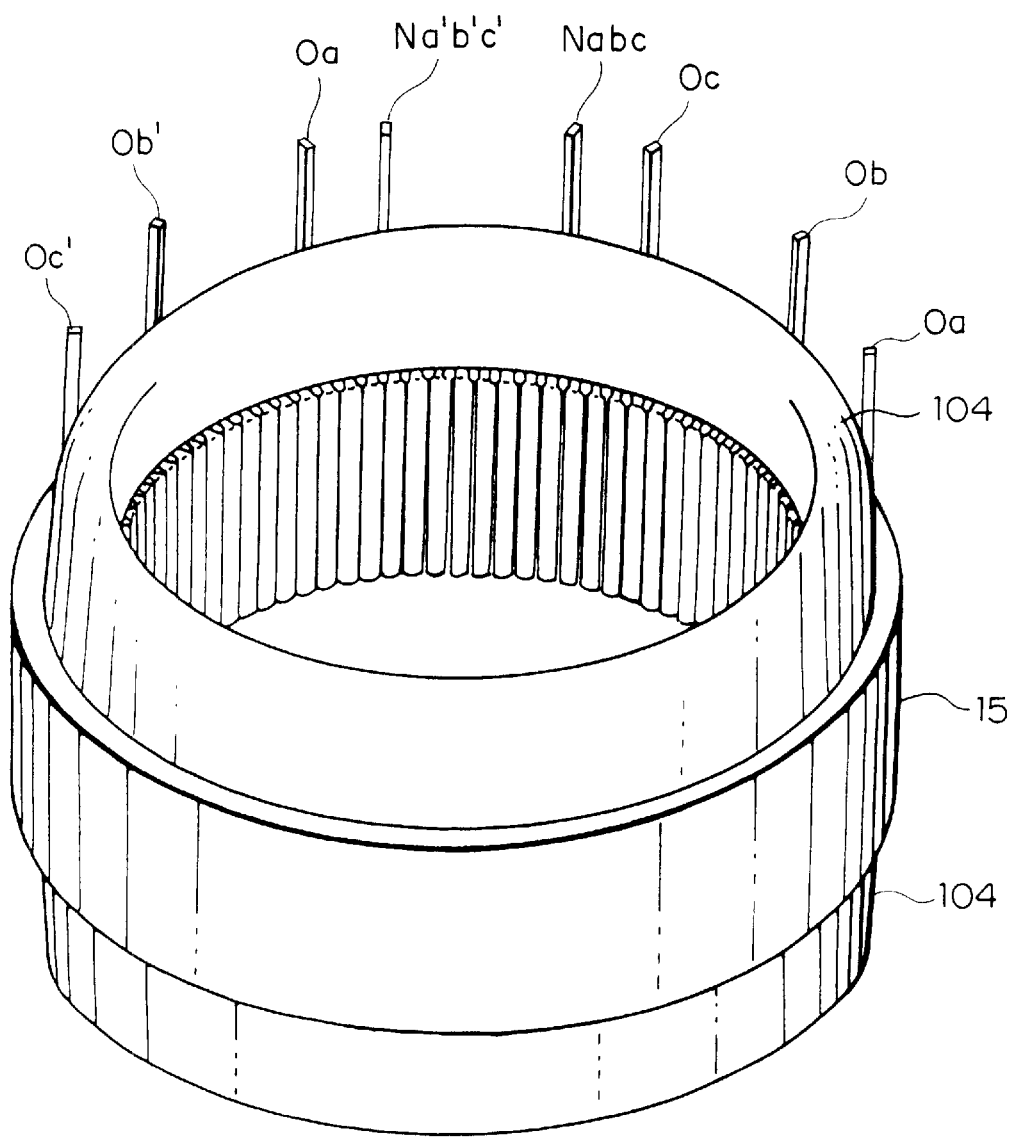
FIG. 21 is a perspective showing a stator of the automotive alternator according to Embodiment 5 of the present invention.
Figure 22:
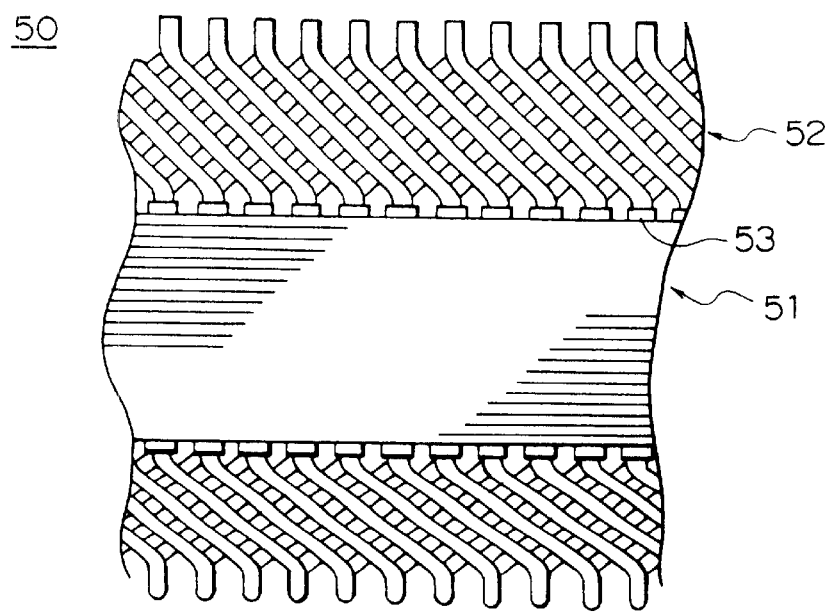
FIG. 22 is a side elevation showing part of a stator of a conventional automotive alternator.
Figure 23:
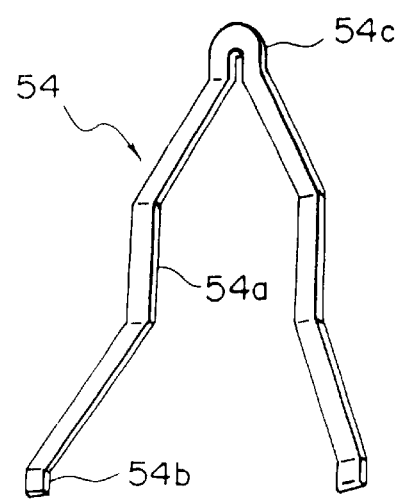
FIG. 23 is a perspective showing a conductor segment used in the stator of the conventional automotive alternator.
Figure 24:
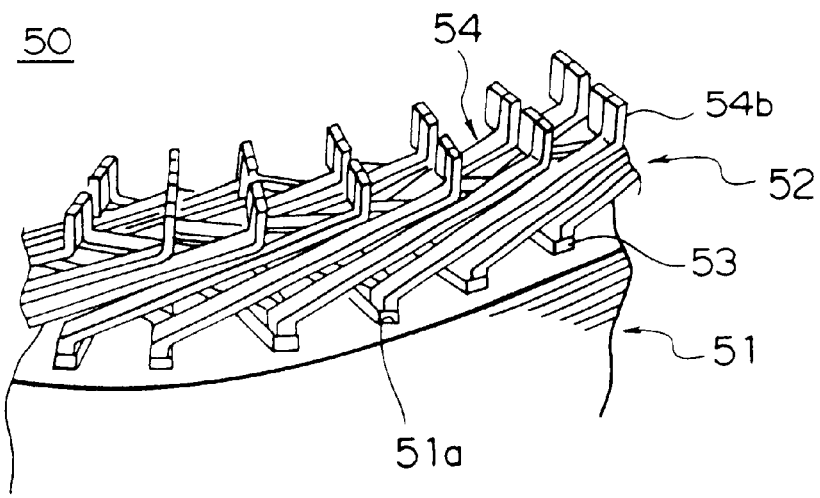
FIG. 24 is a perspective of part of the stator of the conventional automotive alternator from a front end.
Figure 25:
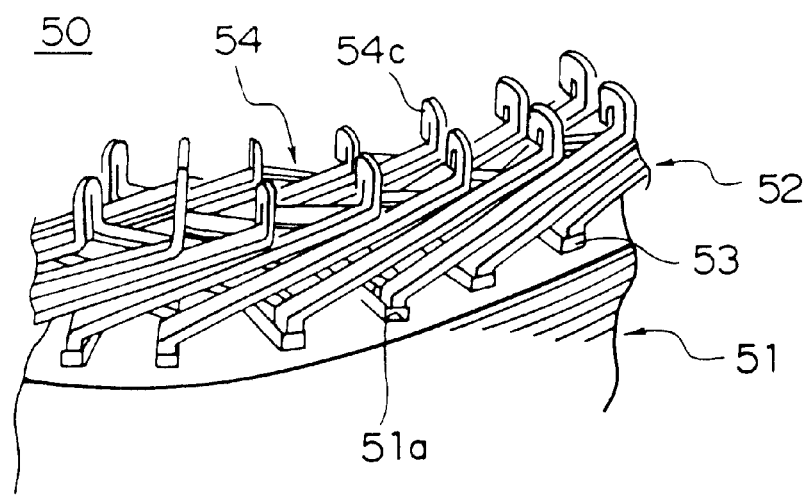
FIG. 25 is a perspective of part of the stator of the conventional automotive alternator from a rear end.

FIG. 21 is a perspective showing a stator of the automotive alternator according to Embodiment 5 of the present invention.

In FIG. 21, coil ends of a stator winding are molded with an electrically-insulative resin 104 such as epoxy resin, and all joining portions of the winding are embedded in the electrically-insulative resin 104.

Moreover, the rest of the construction is the same as in Embodiment 1 above.

According to Embodiment 5, because portions joining the first to fourth winding sub-portions 31 to 34 to each other, adjacent-address crossover connections and same-address crossover connections, and also terminals 101 and 102 are embedded the electrically-insulative resin 104, insulation is improved and dislodgement of the joining portions is prevented, improving reliability.

Moreover, in each of the above embodiments, the fans 5 are disposed inside the case 3, but a fan may also be disposed outside the automotive alternator so as to rotate together with the rotation of the rotor.

Each of the above embodiments has been explained for six turns, four turns and two turns, but when even lower-speed output is required eight turns may be used. Such cases can also be adapted to simply by inserting winding assemblies into the stator core 15 so as to line up in four rows radially. Naturally, odd numbers of turns may also be used.

Each of the above embodiments can also be used in automotive alternators of the type in which the rotor coil is secured to a bracket and a rotating magnetic field is supplied across an air gap.

In each of the above embodiments, the number of slots in the stator was ninety-six slots for sixteen magnetic poles, but three phases and seventy-two slots for twelve magnetic poles, 120 slots for twenty poles, etc., may also be adopted. Furthermore, in the case of one slot per pole per phase, there may also be forty-eight slots for sixteen poles, thirty-six slots for twelve poles, sixty slots for twenty poles, etc.

In each of the above embodiments, the outer core of the stator core was constructed as a laminated body of SPCC material, but the outer core may be constructed as a pipe-shaped solid body.

The slot opening portions may also be narrowed after insertion of the winding groups into the slots of the parallelepiped core by plastically deforming the tooth ends by pressing them with a jig in a radial direction.

Each of the above embodiments used a Lundell-type rotor having claw-shaped magnetic poles, but the same effects can be achieved using a salient-type rotor having projecting magnetic poles.

In each of the above embodiments, the rectifiers are disposed at the end of the rotor away from the pulley and the fan is disposed at the same end, but the fan may also be disposed at the end near the pulley. When there is no particular problem with the temperature of the rectifiers, the fan may also be disposed at the end away from the pulley. Because the height of the coil ends of the stator is low, wind resistance on the discharge side in the wind channel of the fan is significantly reduced, increasing the overall amount of air. Consequently, suitable relative positions for the rectifiers, the pulley, and the fans may also be selected in consideration of the position where the alternator is mounted on the engine, and in consideration of wind noise, of magnetic noise, and of the temperature conditions of each portion.

In each of the above embodiments, the winding is formed with the strands of wire spaced, but because the strands of wire are coated with insulation, the winding may also be formed with the strands of wire completely in close proximity to each other. According to this construction, the density of the coil ends can be further increased, enabling the dimensions thereof to be further reduced. Furthermore, because by reducing the gaps between the strands of wire irregularities are also reduced, enabling wind noise to be reduced further. Because the rigidity of the winding is also increased by contact between the strands of wire, short-circuiting between the strands of wire and between the strands of wire and the core due to vibration can be reduced and magnetic noise can also be reduced. Because heat transfer between the strands of wire is improved, the temperature of the strands of wire becomes more uniform, further reducing the temperature of the stator.

In each of the above embodiments, the insulators are inserted on the stator core side before the insertion of the wire-strand groups into the core, but the insulators may also first be wrapped around the portions of the strands of wire to be housed in the slots and inserted into the core together with the wire-strand groups. Furthermore, a long strip of insulators may be placed on top of the parallelepiped core and the wire-strand groups inserted form above such that the insulators are simultaneously inserted into and housed inside the slots together with the wire-strand groups. In that case, at a later stage, the protruding insulators may be removed together in one step. In addition, the portions of the strands of wire to be housed in the slots may be pre-molded with insulating resin. In that case, mass-producibility is significantly improved.

In each of the above embodiments, the annular core prepared by rolling up the parallelepiped core is inserted into the outer core, then the two cores are integrated by shrink fitting, but the annular core prepared by rolling up the parallelepiped core may be integrated with the outer core by press fitting the former into the latter.

In each of the above embodiments, the stator core was formed by inserting the cylindrical core 37 into the outer core 38 and then shrink fitting the two cores, but a cylindrical core having a thick core back may be prepared, in which case the outer core 38 may be omitted. In the case where the stator core was formed by inserting the cylindrical core 37 into the outer core 38 then shrink fitting the two cores, a gap between the cylindrical core 37 and the outer core 38 is made, causing output to deteriorate, and the rigidity of the stator core is reduced, causing magnetic noise to worsen. In the case where the stator core was formed with only the cylindrical core having the thick core back, there is no abovementioned output deterioration due to the gap between the cylindrical core 37 and the outer core 38, and there is no rigidity deterioration in the stator core due to constituting the stator core with the cylindrical core 37 and the outer core 38, enabling increase in magnetic noise to be suppressed. Further, because the process for inserting the cylindrical core 37 into the outer core 38 is omitted, the productivity of the stator is enhanced.

In each of the above embodiments, copper wire material having a rectangular cross section is used in the strands of wire, but the strands of wire are not limited to copper wire material having a rectangular cross section, and may, for example, be copper wire material having a circular cross section. In that case, formability of the strands of wire is enhanced, facilitating easy placement and connection of the strands of wire, and improving the workability. Further, the strands of wire are not limited to copper wire material, and may, for example, be aluminium wire material.

In each of the above embodiments, four strands of wire are arranged so as to line up in a row radially within each slot and the turn portions are arranged to line up in two rows circumferentially, or six strands of wire are arranged so as to line up in a row radially within each slot and the turn portions are arranged to line up in three rows circumferentially, but eight strands of wire may be arranged so as to line up in a row radially within each slot and the turn portions may be arranged to line up in four rows circumferentally. Because the more the number of the strands of wire lined up in a row radially within each slot and the number of the rows of the turn portions lined up circumferentially increase the more the number of the connection portions increase, the present invention can be used for the construction such that a large number of the strands of wire are arranged so as to line up in a row radially within each slot and the turn portions are arranged so as to line up in a large number of rows circumferentally.

The present invention is constructed in the a above manner and exhibits the effects described below.

According to one aspect of the present invention, there is provided a stator for an alternator including a cylindrical stator core composed of a laminated iron core formed with a number of slots extending axially at a predetermined pitch in a circumferential direction, and a stator winding including a number of winding sub-portions in each of which a long strand of wire is wound so as to alternately occupy an inner layer and an outer layer in a slot depth direction within the slots at intervals of a predetermined number of slots, the strand of wire folding back outside the slots at axial end surfaces of the stator core, wherein the winding sub-portions are constituted by at least one winding assembly composed of a pair of first and second winding groups, the first winding group including a number of first winding sub-portions each having one turn constructed by winding one of the strands of wire so as to alternately occupy an inner layer and an outer layer in a slot depth direction within the slots at intervals of the predetermined number of slots, the first winding sub-portions being disposed at a pitch of one slot from each other and being equal in number to the predetermined number of slots, and the second winding group including a number of second winding sub-portions each having one turn constructed by winding one of the strands of wire so as to alternately occupy an inner layer and an outer layer in a slot depth direction within the slots at intervals of the predetermined number of slots and so as to be inversely wound and offset by an electrical angle of 180° relative to the first winding sub-portions, the second winding sub-portions being disposed at a pitch of one slot from each other and being equal in number to the predetermined number of slots, wherein the stator winding is constituted by a three-phase alternating-current winding occupying n slots per phase per pole in which there is a phase difference corresponding to an electrical angle of 120° between each phase, and wherein the first winding sub-portions and the second winding sub-portions which constitute the same phase within the winding assembly are connected by same-address crossover connections at the same address in each phase, the same-address crossover connections of each phase being disposed at a slot pitch of 4n or more. Thus, the number of joints in the coil ends is significantly reduced, improving corrosion resistance and insulation, and a number of windings can be installed in the stator core simultaneously as winding assemblies, improving assembly and productivity. In addition, the same-address crossover connections of each phase can be disposed circumferentially without contacting each other, enabling increases in the height of the coil ends to be suppressed.

According to another aspect of the present invention, there is provided a stator for an alternator including a cylindrical stator core composed of a laminated iron core formed with a number of slots extending axially at a predetermined pitch in a circumferential direction, and a stator winding including a number of winding sub-portions in each of which a long strand of wire is wound so as to alternately occupy an inner layer and an outer layer in a slot depth direction within the slots at intervals of a predetermined number of slots, the strand of wire folding back outside the slots at axial end surfaces of the stator core, wherein the winding sub-portions are constituted by at least one winding assembly composed of a pair of first and second winding groups, the first winding group including a number of first winding sub-portions each having one turn constructed by winding one of the strands of wire so as to alternately occupy an inner layer and an outer layer in a slot depth direction within the slots at intervals of the predetermined number of slots, the first winding sub-portions being disposed at a pitch of one slot from each other and being equal in number to the predetermined number of slots, and the second winding group including a number of second winding sub-portions each having one turn constructed by winding one of the strands of wire so as to alternately occupy an inner layer and an outer layer in a slot depth direction within the slots at intervals of the predetermined number of slots and so as to be inversely wound and offset by an electrical angle of 180° relative to the first winding sub-portions, the second winding sub-portions being disposed at a pitch of one slot from each other and being equal in number to the predetermined number of slots, wherein the stator winding is constituted by a three-phase alternating-current winding occupying n slots per phase per pole in which there is a phase difference corresponding to an electrical angle of 120° between each phase, and wherein the first winding sub-portions and the second winding sub-portions which constitute the same phase within the winding assembly are connected by same-address crossover connections at addresses different from adjacent phases, the same-address crossover connections of each phase being disposed at a slot pitch of 2n or more. Thus, the number of joints in the coil ends is significantly reduced, improving corrosion resistance and insulation, and a number of windings can be installed in the stator core simultaneously as winding assemblies, improving assembly and productivity. In addition, the same-address crossover connections of each phase can be disposed circumferentially without contacting each other, enabling increases in the height of the coil ends to be suppressed. Furthermore, the arrangement of the same-address crossover connections of each phase can be concentrated, improving the connecting operation.

Because two winding assemblies may be installed in the stator core so as to be aligned in two rows in a radial direction, and each phase constituting the three-phase alternating current winding may be constituted by a winding portion having four turns in which first and second winding sub-portions wound into the same slot group are connected in series, a three-phase alternating current winding in which each phase is composed of a winding portion having four turns can be constructed simply.

Because each phase constituting the three-phase alternating current winding may be constituted by a winding portion having four turns in which end portions of the first and second winding sub-portions are connected between the two winding assemblies by two adjacent-address crossover connections, and end portions of the first and second winding sub-portions may be connected within one of the winding assemblies by one same-address crossover connection, the crossover connection portions have a simple construction, improving the connecting operation.

Because each phase constituting the three-phase alternating current winding may be constituted by a winding portion having four turns in which end portions of the first and second winding sub-portions are connected within each of the winding assemblies by one same-address crossover connection, and end portions of the first and second winding sub-portions are connected between the two winding assemblies by one adjacent-address crossover connection, the crossover connection portions have a simple construction, improving the connecting operation.

Because three winding assemblies may be installed in the stator core so as to be aligned in three rows in a radial direction, and each phase constituting the three-phase alternating current winding may be constituted by a winding portion having six turns in which first and second winding sub-portions wound into the same slot group are connected in series, a three-phase alternating current winding in which each phase is composed of a winding portion having six turns can be constructed simply.

Because the same-address crossover connection may be made using a metal crossover connection terminal, clamps for securing the end portions of the winding sub-portions being connected are no longer required, enabling the number of parts to be reduced, and the length of the end portions of the winding sub-portions being connected can be shortened, alleviating operations of pulling around and bending the end portions.

Because end portions of the winding sub-portions constituting neutral points of the three-phase alternating-current winding may be connected using a metal neutral-point connection terminal, clamps for securing the end portions of the winding sub-portions being connected are no longer required, enabling the number of parts to be reduced, and the length of the end portions of the winding sub-portions being connected can be shortened, alleviating operations of pulling around and bending the end portions.

Because a neutral-point lead may be integrated into the metal neutral-point connection terminal, there is no need to dispose a separate lead for outputting neutral point current from the three-phase alternating-current winding, improving the connecting operation.

Because the metal crossover connection terminal and the metal neutral-point connection terminal may be integrated by an electrically-insulative resin, the process of positioning the terminals in the alternating-current connecting operation only needs to be performed once, enabling a reduction in the number of operations.

Because connection of the first and second winding sub-portions may be made by arc welding, great joint strength can be achieved, enabling reliability to be improved.

Because a cross-sectional shape of the strands of wire may be a generally flattened shape, contact surface area at the joint portions can be increased, enabling joint strength to be increased.

Because a coil end of the stator winding may be molded in an electrically-insulative resin, the joint portions are embedded in the electrically-insulative resin, improving corrosion resistance and insulation, and also preventing dislodgement of the joint portions as a result of vibration.

What is claimed is:

1. A stator for an alternator, comprising:
    a cylindrical stator core composed of a laminated iron core formed with a number of slots extending axially at a predetermined pitch in a circumferential direction; and
    a stator winding comprising a number of winding sub-portions in each of which a long strand of wire is wound so as to alternately occupy an inner layer and an outer layer in a slot depth direction within said slots at intervals of a predetermined number of slots, said strand of wire folding back outside said slots at axial end surfaces of said stator core,
    wherein said winding sub-portions are constituted by at least one winding assembly composed of a pair of first and second winding groups, said first winding group comprising a number of first winding sub-portions each having one turn constructed by winding one of said strands of wire so as to alternately occupy an inner layer and an outer layer in a slot depth direction within said slots at intervals of said predetermined number of slots, said first winding sub-portions being disposed at a pitch of one slot from each other and being equal in number to said predetermined number of slots, and said second winding group comprising a number of second winding sub-portions each having one turn constructed by winding one of said strands of wire so as to alternately occupy an inner layer and an outer layer in a slot depth direction within said slots at intervals of said predetermined number of slots and so as to be inversely wound and offset by an electrical angle of 180° relative to said first winding sub-portions, said second winding sub-portions being disposed at a pitch of one slot from each other and being equal in number to said predetermined number of slots,
    wherein said stator winding is constituted by a three-phase alternating-current winding occupying n slots per phase per pole in which there is a phase difference corresponding to an electrical angle of 120° between each phase, and
    wherein said first winding sub-portions and said second winding sub-portions which constitute the same phase within said winding assembly are connected by same-address crossover connections at the same address in each phase, said same-address crossover connections of each phase being disposed at a slot pitch of 4n or more.

2. The stator for an alternator according to claim 1 wherein:
    two of said winding assemblies are installed in said stator core so as to be aligned in two rows in a radial direction; and
    each phase constituting said three-phase alternating current winding is constituted by a winding portion having four turns in which first and second winding sub-portions wound into the same slot group are connected in series.

3. The stator for an alternator according to claim 2 wherein each phase constituting said three-phase alternating current winding is constituted by a winding portion having four turns in which end portions of said first and second winding sub-portions are connected between said two winding assemblies by two adjacent-address crossover connections, and end portions of said first and second winding sub-portions are connected within one of said winding assemblies by one same-address crossover connection.

4. The stator for an alternator according to claim 2 wherein each phase constituting said three-phase alternating current winding is constituted by a winding portion having four turns in which end portions of said first and second winding sub-portions are connected within each of said winding assemblies by one same-address crossover connection, and end portions of said first and second winding sub-portions are connected between said two winding assemblies by one adjacent-address crossover connection.

5. The stator for an alternator according to claim 1 wherein:
    three of said winding assemblies are installed in said stator core so as to be aligned in three rows in a radial direction; and
    each phase constituting said three-phase alternating-current winding is constituted by a winding portion having six turns in which first and second winding sub-portions wound into the same slot group are connected in series.

6. The stator for an alternator according to claim 1 wherein said same-address crossover connection is made using a metal crossover connection terminal.

7. The stator for an alternator according to claim 1 wherein end portions of said winding sub-portions constituting neutral points of said three-phase alternating-current winding are connected using a metal neutral-point connection terminal.

8. The stator for an alternator according to claim 7 wherein a neutral-point lead is integrated into said metal neutral-point connection terminal.

9. The stator for an alternator according to claim 7 wherein said metal crossover connection terminal and said metal neutral-point connection terminal are integrated by an electrically-insulative resin.

10. The stator for an alternator according to claim 1 wherein connection of said first and second winding sub-portions is made by arc welding.

11. The stator for an alternator according to claim 1 wherein said strands of wire have a generally flattened cross-sectional shape.

12. The stator for an alternator according to claim 1 wherein a coil end of said stator winding is molded in an electrically-insulative resin.

13. A stator for an alternator, comprising:
   a cylindrical stator core composed of laminated iron core formed with a number of slots extending axially at a predetermined pitch in a circumferential direction; and
   a stator winding comprises a number of winding sub-portions in each of which a long strand of wire is wound so as to alternately occupy an inner layer and an outer layer in a slot depth direction within said slots at intervals of a predetermined number of slots, said strand of wire folding back outside said slots at axial end surfaces of said stator core,
   wherein said winding sub-portions are constituted by at least one winding assembly composed of a pair of first and second winding groups, said first winding group comprising a number of first winding sub-portions each having one turn constructed by winding one of said strands of wire so as to alternately occupy an inner layer and an outer layer in a slot depth direction within said slots at intervals of said predetermined number of slots, said first winding sub-portions being dispossed at a pitch of one slot from each other and being equal in number to said predetermined number of slots, and said second winding group comprising a number of second winding sub-portions each having one turn constructed by winding one of said strands of wire so as to alternately occupy an inner layer and an outer layer in a slot depth direction within said slots at intervals of said predetermined number of slots and so as to be inversely wound and offset by an electrical angle of 180° relative to said first winding sub-portions, said second winding sub-portions being disposed at a pitch of one slot from each other and being equal in number to said predetermined number of slots,
   wherein said stator winding is constituted by a three-phase alternating-current winding occupying n slots per phase per pole in which there is a phase difference corresponding to an electrical angle of 120° between each phase, and
   wherein said first winding sub-portions and said second winding sub-portions which constitute the same phase within said winding assembly are connected by same-address crossover connections at addresses different from adjacent phases, said same-address crossover connections of each phase being disposed at a slot pitch of 2n or more.

14. The stator for an alternator according to claim 13 wherein:
   two of said winding assemblies are installed in said stator core so as to be aligned in two rows in a radial direction; and
   each phase constituting said three-phase alternating current winding is constituted by a winding portion having four turns in which first and second winding sub-portions wound into the same slot group are connected in series.

15. The stator for an alternator according to claim 14 wherein each phase constituting said three-phase alternating current winding is constituted by a winding portion having four turns in which end portions of said first and second winding sub-portions are connected between said two winding assemblies by two adjacent-address crossover connections, and end portions of said first and second winding sub-portions are connected within one of said winding assemblies by one same-address crossover connection.

16. The stator for an alternator according to claim 14 wherein each phase constituting said three-phase alternating current winding is constituted by a winding portion having four turns in which end portions of said first and second winding sub-portions are connected within each of said winding assemblies by one same-address crossover connection, and end portions of said first and second winding sub-portions are connected between said two winding assemblies by one adjacent-address crossover connection.

17. The stator for an alternator according to claim 13 wherein:
   three of said winding assemblies are installed in said stator core so as to be aligned in three rows in a radial direction; and
   each phase constituting said three-phase alternating current winding is constituted by a winding portion having six turns in which first and second winding sub-portions wound into the same slot group are connected in series.

* * * * *